(12) United States Patent
Tsiberidis

(10) Patent No.: US 12,005,732 B2
(45) Date of Patent: *Jun. 11, 2024

(54) EMERGENCY WHEEL

(71) Applicant: GV ENGINEERING GMBH, Heimsheim (DE)

(72) Inventor: Konstantin Tsiberidis, Untergruppenbach (DE)

(73) Assignee: GV ENGINEERING GMBH, Heimsheim (DE)

( * ) Notice: Subject to any disclaimer, the term of this patent is extended or adjusted under 35 U.S.C. 154(b) by 994 days.

This patent is subject to a terminal disclaimer.

(21) Appl. No.: 16/963,060

(22) PCT Filed: Jan. 18, 2019

(86) PCT No.: PCT/EP2019/051264
§ 371 (c)(1),
(2) Date: Aug. 7, 2020

(87) PCT Pub. No.: WO2019/141816
PCT Pub. Date: Jul. 25, 2019

(65) Prior Publication Data
US 2022/0348038 A1   Nov. 3, 2022

(30) Foreign Application Priority Data
Jan. 22, 2018 (DE) .......... 102018101355.8

(51) Int. Cl.
*B60B 11/10* (2006.01)
*B60B 15/26* (2006.01)

(52) U.S. Cl.
CPC ............ *B60B 11/10* (2013.01); *B60B 15/263* (2013.01); *B60B 2310/305* (2013.01); *B60B 2310/306* (2013.01); *B60B 2900/731* (2013.01)

(58) Field of Classification Search
CPC ....... B60B 11/10; B60B 15/26; B60B 15/263; B60B 7/063; B60B 7/066
See application file for complete search history.

(56) References Cited

U.S. PATENT DOCUMENTS

| 1,055,372 | A | | 3/1913 | Turnbull |
| 2,454,923 | A | | 11/1948 | Howell, Jr. |
| 2,989,347 | A | | 6/1961 | Leopold |
| 3,112,138 | A | * | 11/1963 | Kauer ................... B60B 15/263 301/47 |

(Continued)

FOREIGN PATENT DOCUMENTS

| DE | 1240430 B | 5/1967 |
| EP | 0606946 A1 | 7/1994 |

(Continued)

OTHER PUBLICATIONS

PCT International Search Report and Written Opinion completed by the ISA/EP dated Jan. 16, 2019 and issued in connection with PCT/EP2018/077353.

(Continued)

*Primary Examiner* — Jason R Bellinger
(74) *Attorney, Agent, or Firm* — Barnes & Thornburg LLP

(57) ABSTRACT

An attachment is provided for a vehicle wheel for enabling a driving operation with restricted tire functions. A system includes the attachment and a rim of a vehicle wheel.

21 Claims, 17 Drawing Sheets

(56) References Cited

U.S. PATENT DOCUMENTS

| | | | |
|---|---|---|---|
| 3,112,784 A | 12/1963 | Montenare | |
| 4,127,305 A * | 11/1978 | Nielsen | B60B 11/06 403/14 |
| 4,666,216 A | 5/1987 | Smith | |
| 6,068,346 A | 5/2000 | Pender | |
| 6,217,125 B1 | 4/2001 | Tubetto | |
| 11,498,359 B2 * | 11/2022 | Tsiberidis | B60B 15/263 |
| 11,712,923 B2 * | 8/2023 | Tsiberidis | B60B 19/00 301/38.1 |
| 2020/0164682 A1 * | 5/2020 | Tsiberidis | B60B 15/26 |
| 2020/0223250 A1 * | 7/2020 | Tsiberidis | B60B 15/263 |
| 2021/0039432 A1 * | 2/2021 | Tsiberidis | B60C 17/042 |
| 2021/0053391 A1 * | 2/2021 | Tsiberidis | B60B 19/00 |
| 2022/0041011 A1 * | 2/2022 | Tsiberidis | B60B 15/26 |
| 2023/0098604 A1 * | 3/2023 | Tsiberidis | B60B 11/10 301/40.3 |

FOREIGN PATENT DOCUMENTS

| | | |
|---|---|---|
| EP | 2048003 B1 | 4/2009 |
| FR | 1043038 A | 11/1953 |
| GB | 857897 A | 1/1961 |
| WO | 2001038106 A1 | 5/2001 |
| WO | 2006123044 A2 | 11/2006 |

OTHER PUBLICATIONS

PCT International Preliminary Examination Report mailed by the ISA/EP dated Jan. 16, 2020 and issued in connection with PCT/EP2018/077353.

PCT International Search Report and Written Opinion completed by the ISA/EP dated May 9, 2019 and issued in connection with PCT/EP2019/051264.

PCT International Preliminary Examination Report mailed by the ISA/EP dated Dec. 17, 2019 and issued in connection with PCT/EP2019/051264.

PCT International Search Report and Written Opinion completed by the ISA/EP dated May 9, 2019 and issued in connection with PCT/EP2019/051265.

PCT International Preliminary Examination Report mailed by the ISA/EP dated Nov. 22, 2019 and issued in connection with PCT/EP2019/051265.

* cited by examiner

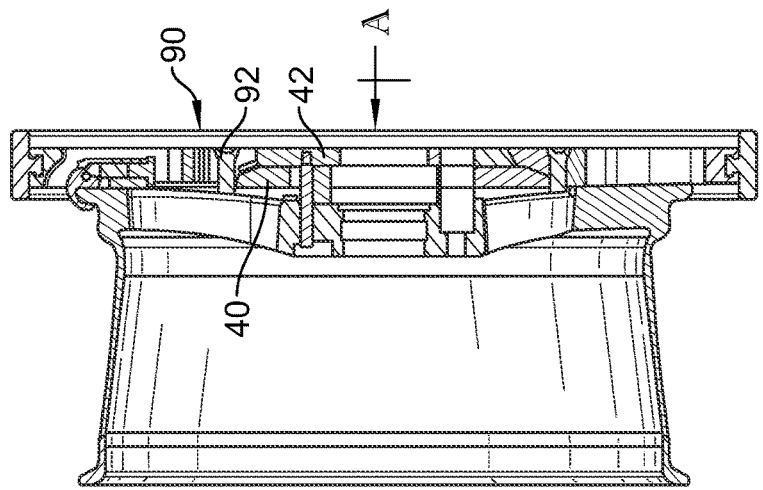
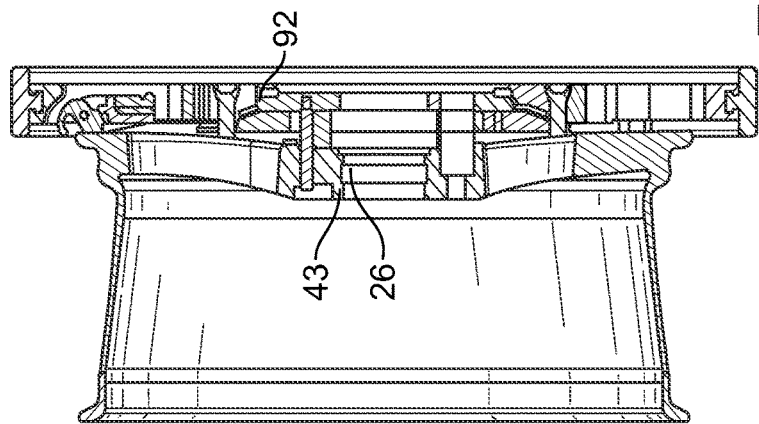
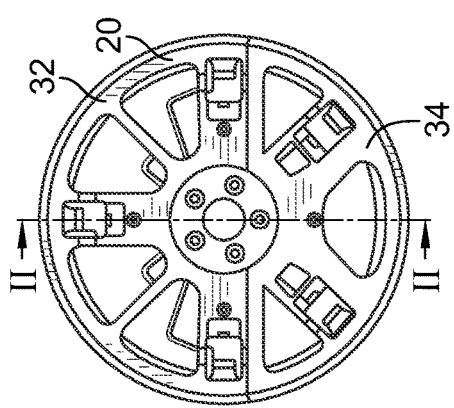
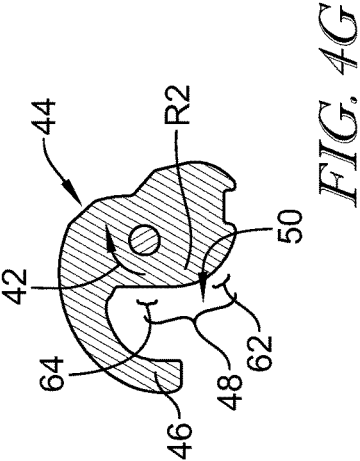
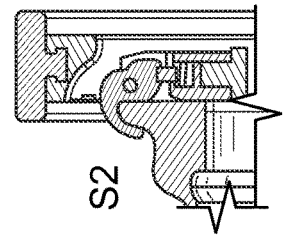
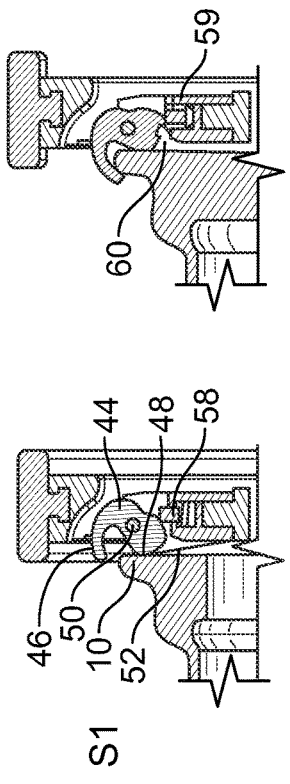
FIG. 4A  FIG. 4B  FIG. 4C  FIG. 4D  FIG. 4E  FIG. 4F  FIG. 4G

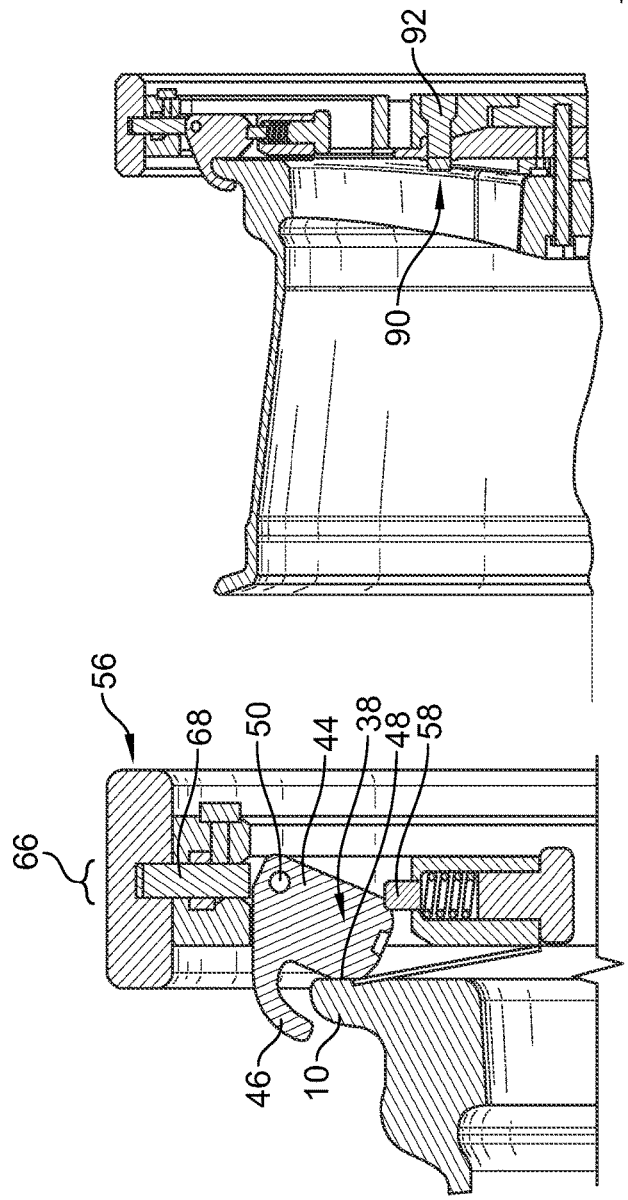
FIG. 5A
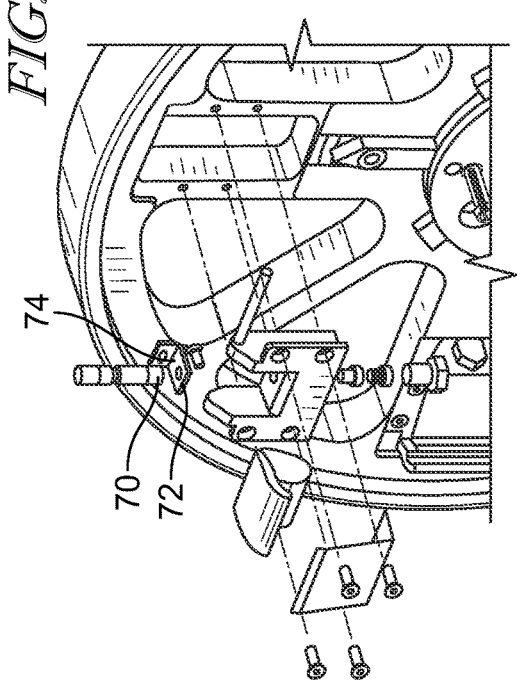
FIG. 5B
FIG. 5C
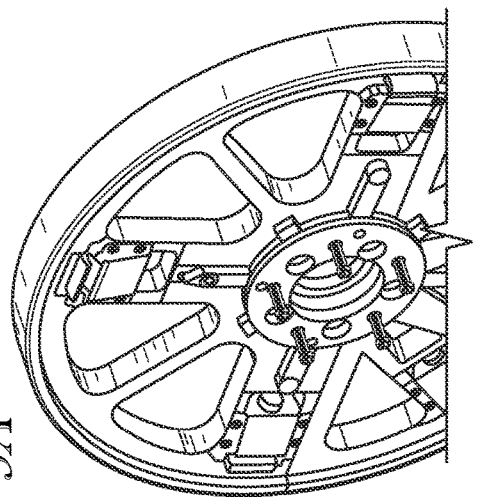
FIG. 5D

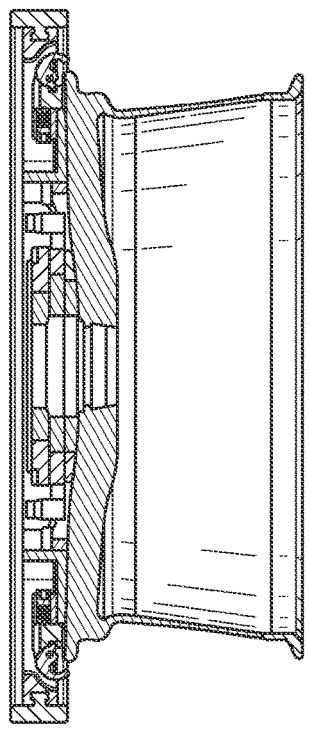
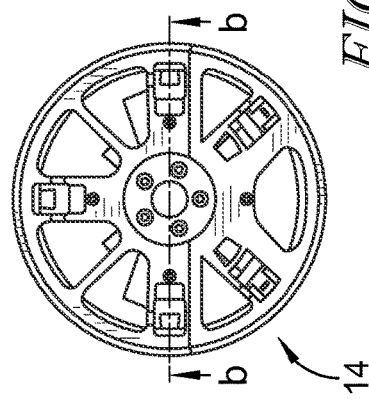
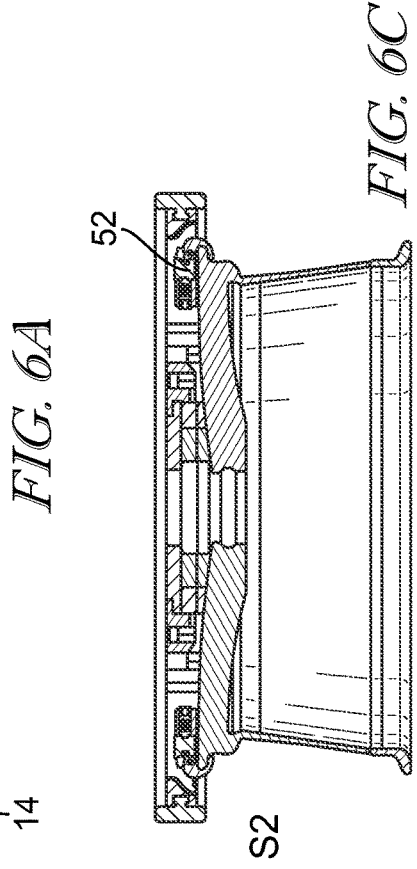
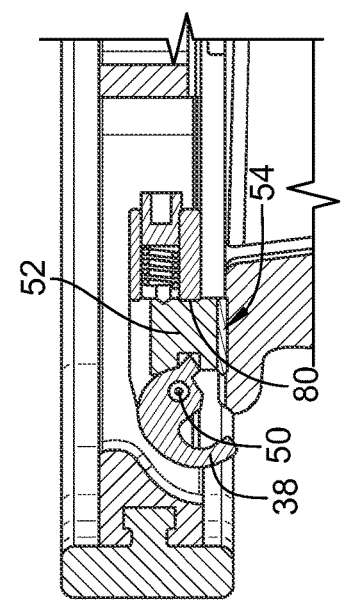
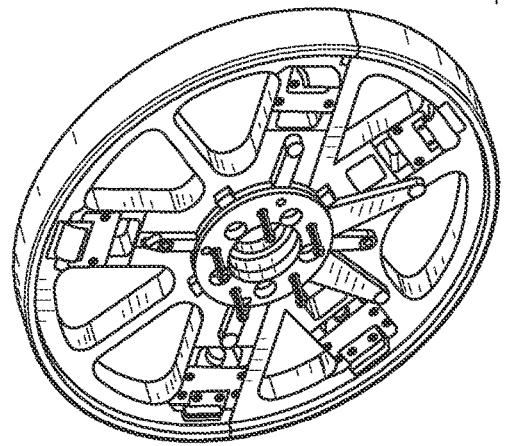
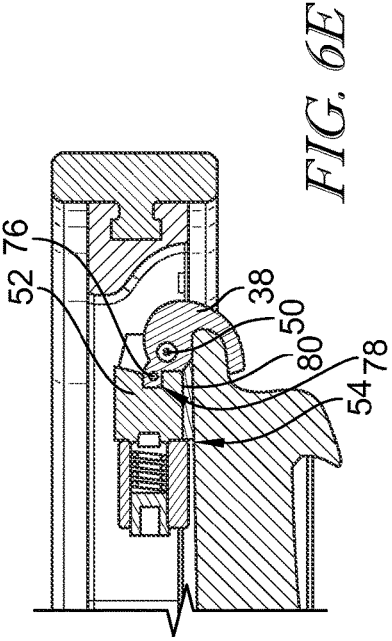
FIG. 6A
FIG. 6B
FIG. 6C
FIG. 6D
FIG. 6E
FIG. 6F

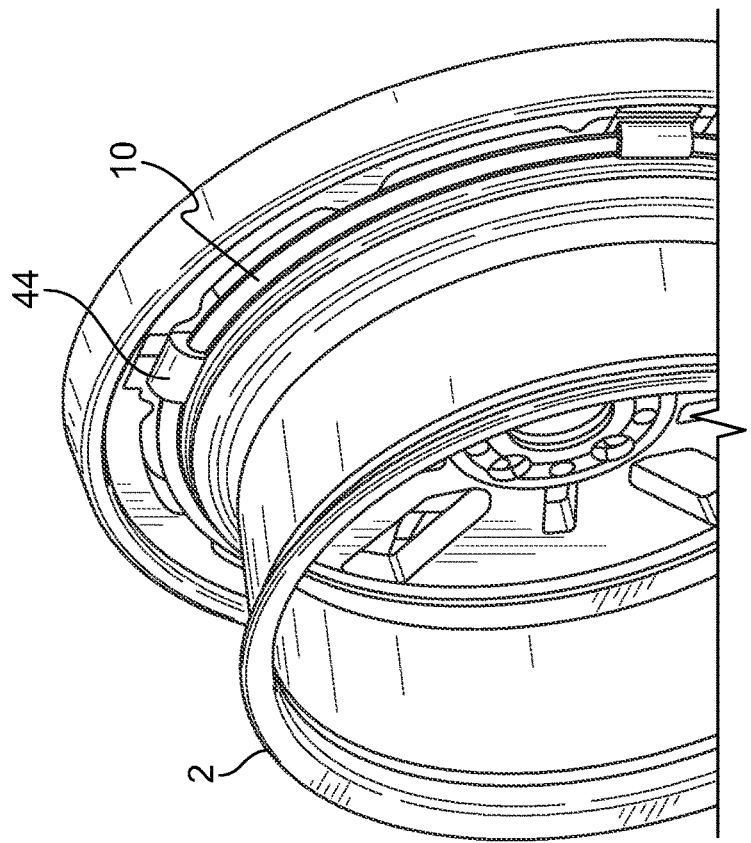
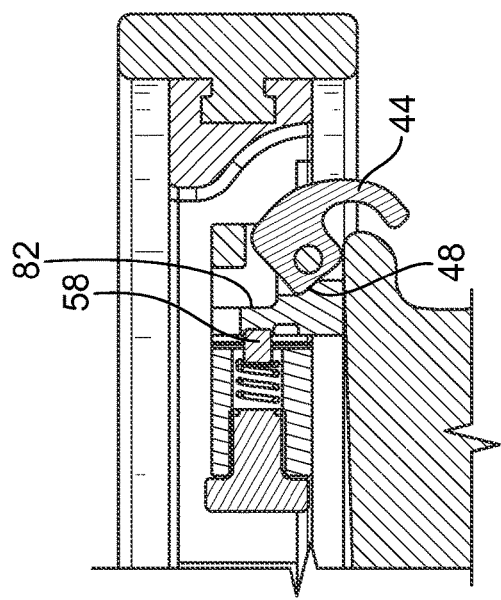
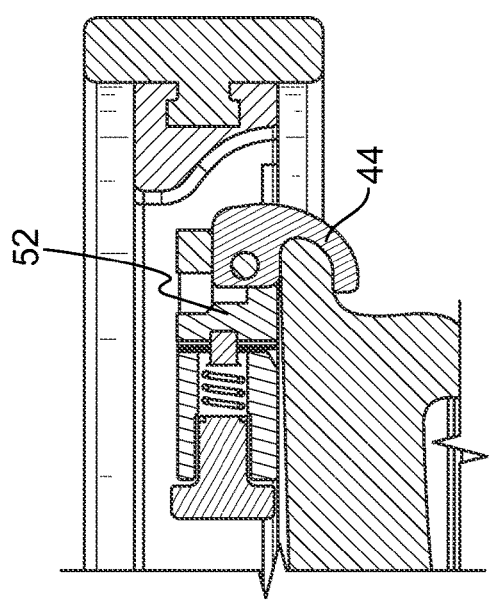

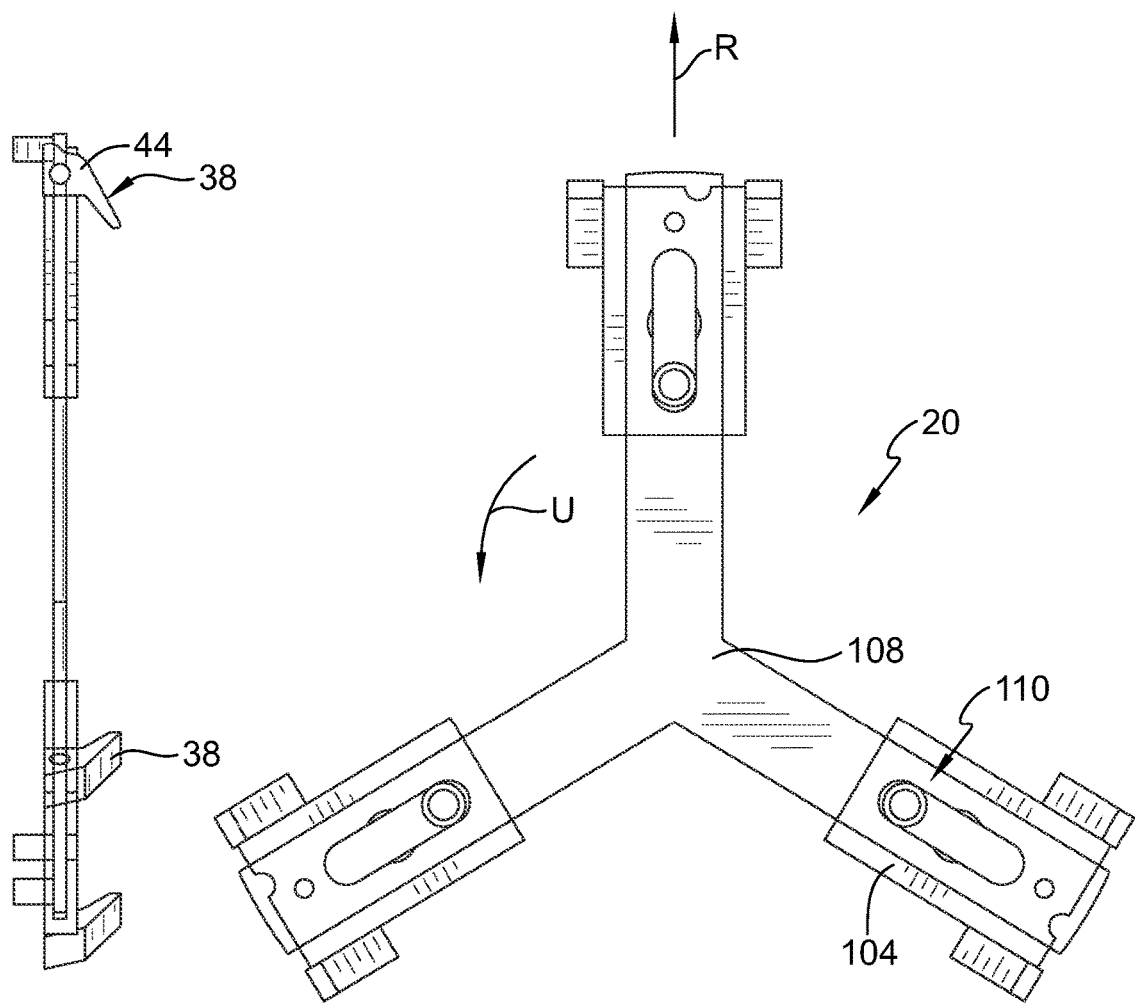
*FIG. 9A*  *FIG. 9B*
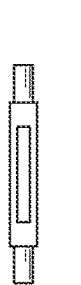
*FIG. 9C*
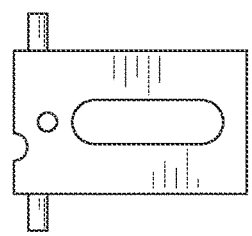
*FIG. 9D*
*FIG. 9E*
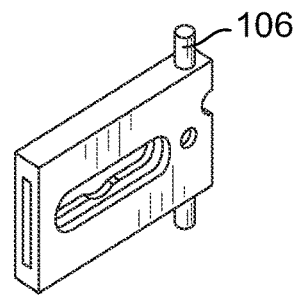
*FIG. 9F*

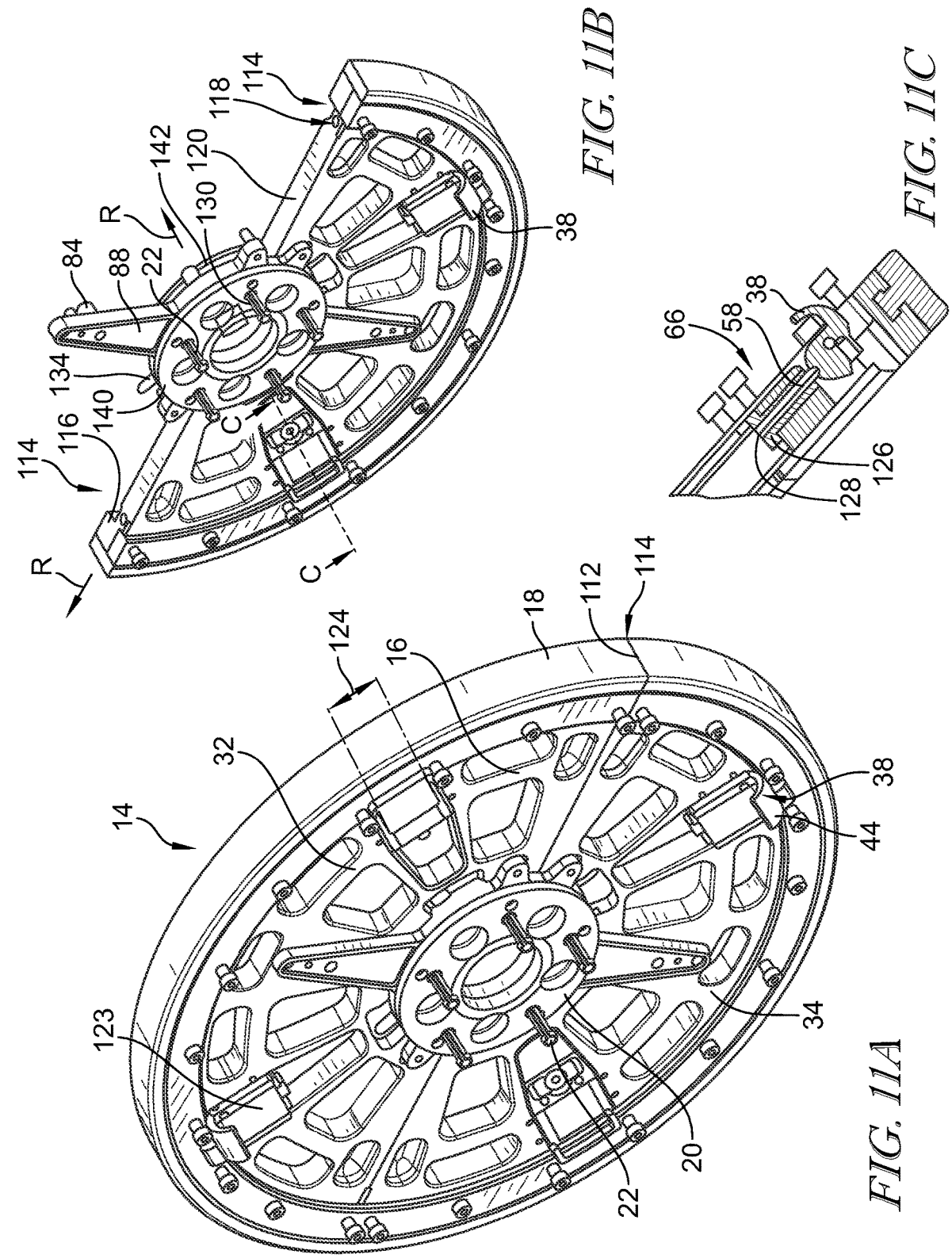

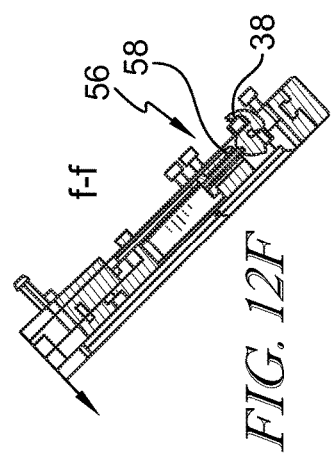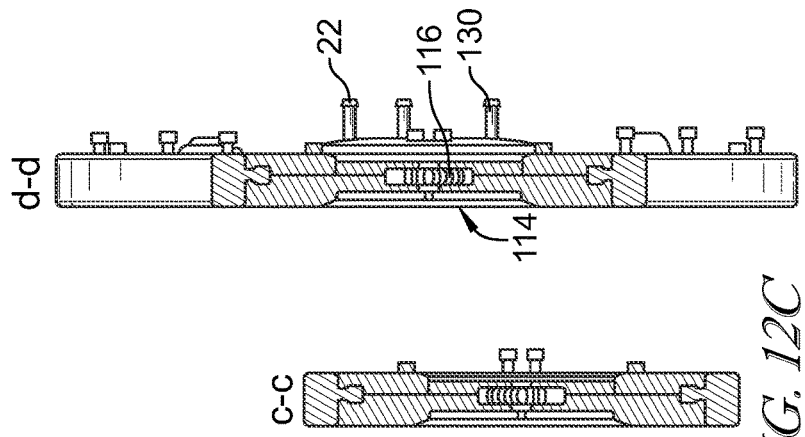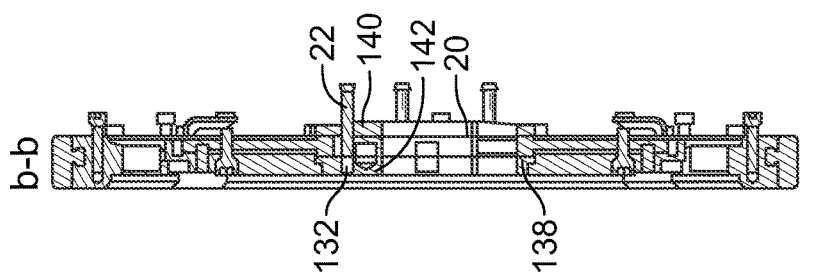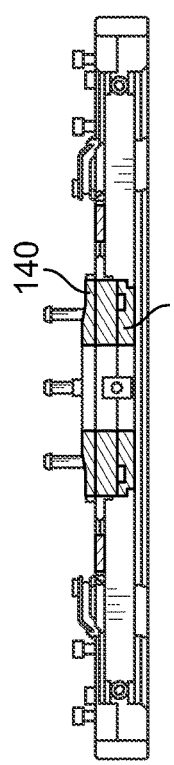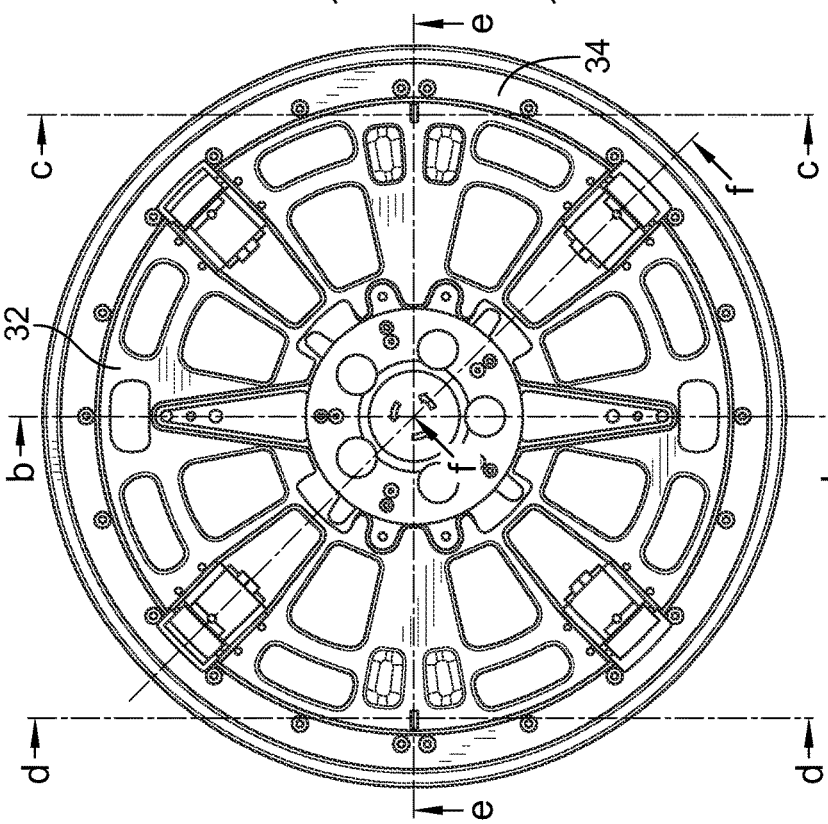

EMERGENCY WHEEL

CROSS-REFERENCE TO RELATED APPLICATIONS

This is a national stage entry of International Patent Application No. PCT/EP2019/051264, filed Jan. 18, 2019, which claims the benefit of and priority to German Patent Application No. 10 2018 101 355.8, filed Jan. 22, 2018, the disclosures of which are expressly incorporated herein by reference in their entireties.

FIELD OF THE DISCLOSURE

The present invention relates to an attachment for a vehicle wheel for enabling a driving operation with a restricted tyre function.

The present invention also relates independently thereof to a system comprising an attachment and a rim of a vehicle wheel.

BACKGROUND AND SUMMARY

Vehicle wheel in the present case means a vehicle wheel of a motor vehicle. Driving operation with a restricted tyre function means here a driving operation in which the tyre is not operable with its given properties in normal road conditions and a normal tyre state. A journey with a flat tyre can be meant thereby, for example, or also operation of the vehicle on ice and packed snow. A preferred application of the present invention is enabling a journey with a flat tyre.

In the case of an attachment affixed to the vehicle wheel, axial direction means here the direction of the rotary axis of the vehicle wheel. The radial direction means the direction orthogonal to this rotary axis of the vehicle wheel. Viewed from the rim of the vehicle wheel, the tyre of the vehicle wheel is thus arranged radially on the outside. Radially on the inside is a bolt pattern of the rim, for example, with a centre opening of the vehicle wheel, the bolt pattern of the vehicle wheel meaning here the arrangement of the holes in the rim that are provided to receive wheel bolts or stay bolts, and the centre opening.

Circumferential direction means the direction along the circumference of the vehicle wheel, thus along its tyre tread.

The object of the present invention is to provide an attachment for a vehicle wheel that can be assembled easily, quickly and securely. In particular, the attachment should prevent incorrect assembly. Another object is to provide a system comprising an attachment and a rim that permits assembly of the attachment on the rim in a simple and secure manner.

This object is achieved by the attachment.

The attachment according to the invention is thus an attachment for a vehicle wheel, which comprises a rim, to enable a driving operation with a restricted tyre function, wherein the attachment has a tread section, which comprises a tread of the attachment, and wherein the attachment comprises at least one clamping device, which is designed to engage behind a section, preferably a rim flange, of the rim, wherein the attachment comprises an initial mounting section, wherein at least a part of the tread section is designed separately from the initial mounting section and connectable detachably thereto or is designed movably relative to this, and wherein the initial mounting section is arranged radially inward from the tread when the attachment is fastened to the vehicle wheel.

The attachment is preferably designed so that the initial mounting section and the tread section, thus the part of the attachment comprising the tread of the attachment, are designed to be separate and completely detachable from one another. The tread section preferably comprises in turn at least two circumferential segments, which are detachable from one another and can be put together so that they form the circular tread.

The clamping device is preferably designed complementary to the contour of the rim flange, which is standardised according to DIN 7817. On motor cars this is usually the form J of DIN 7817.

The attachment preferably has a tread section with precisely two circumferential segments, which in particular both have a circumferential extension of 180°, are in particular substantially identical in construction, preferably comprising identical base elements, which are formed as castings. Precisely two clamping devices, which are each designed as pivotable hook elements, are preferably arranged on each of these two circumferential segments. Each of the hook elements preferably has an extension in a circumferential direction of at least 30 mm, preferably 40 mm, in particular 50 mm.

The clamping devices are preferably designed as a prefabricated part, which is screwed onto the base elements of the circumferential segments.

If the tread section, as mentioned above, comprises several circumferential segments, for example the aforesaid first circumferential segment and the second circumferential segment, it is advantageous if a connection device is arranged on their contact surfaces with one another, in order preferably to connect the circumferential segments to one another so that they cannot be displaced relative to one another in an axial direction. The connection device can be implemented, for example, by way of an element which is preloaded via a spring and is arranged in one of the circumferential segments and protrudes from the contact surface with spring loading in a circumferential direction. Arranged on the other circumferential segment is a corresponding recess in which the spring-preloaded element can engage.

After the first circumferential segment has been attached to the initial mounting section, the second circumferential segment can be pushed on in an axial direction, for example. When the two contact surfaces slide over one another, the spring-preloaded element is thrust in a circumferential direction into the first circumferential segment, the spring-preloaded element then engaging in the recess on the second circumferential segment when the second circumferential segment has been pushed fully in an axial direction into the provided position. The connection device secures the two circumferential segments of the tread section against displacement of the two segments in an axial direction relative to one another.

The connection device preferably has generally one, in particular preloaded, element, which is arranged supported movably in one circumferential segment and extends into another circumferential segment when the attachment is fastened to the vehicle wheel.

The hook element of the clamping devices preferably has a resilient coating.

The initial mounting section can be designed, for example, in the form of struts, for example three struts, connected to one another and running radially outwards, preferably distributed uniformly in a circumferential direction.

The initial mounting section can also be designed, for example, with a circular or disc-shaped central section. Struts running radially outwards preferably extend out from this central section.

The initial mounting section is a part of the attachment that is designed to be fastened to the vehicle wheel before the tread section. In this case the tread section can already be connected to the initial mounting section. On affixing the attachment, first the initial mounting section is fastened to the vehicle wheel and then the tread section is fastened or brought into its final position and fastened. With the attachment according to the invention it is thus possible to fasten the initial mounting section first. The initial mounting section is preferably designed to be fastened to the rim in the region of the bolt pattern. As will be explained in detail further below, the tread section can be designed to be detachable from the initial mounting section. The attachment is preferably designed so that first the initial mounting section is fastenable without the tread section to the vehicle wheel and after the initial mounting section has been fastened on the vehicle wheel, the tread section is applied to the vehicle wheel with initial mounting section and fastened to this. The tread section can also be connected, in particular non-detachably, and movably and/or pivotably to the initial mounting section. The attachment can be fastened to the rim of the vehicle wheel on assembly in a first step by means of the initial mounting section. If necessary the attachment, in particular the tread section, can then additionally be fastened, preferably to the initial mounting section and the vehicle wheel or the rim of the vehicle wheel.

The fastening of the initial mounting section and/or the tread section is preferably possible by means of a clamping device arranged on the respective section. In particular, the clamping device can be arranged on the tread section. The tread section can be fastened particularly securely to the vehicle wheel hereby. In particular, the clamping device can be arranged on the initial mounting section. The initial mounting section can be fastened hereby particularly securely to the vehicle wheel. It is also possible that a clamping device of the aforesaid type is arranged both on the tread section and on the initial mounting section. Thus the tread section and the initial mounting section can have a clamping device, which is designed to engage behind the section, preferably the rim flange, of the rim.

Such a clamping device, which is arranged on the initial mounting section, is preferably implemented in such a way that it is arranged movably in a radial direction on the initial mounting section. The clamping device will be discussed in greater detail below.

As already mentioned above, it is preferred if the tread section, seen in a circumferential direction, has at least two segments, which each comprise a portion of the circumference of the tread. The segments are preferably detachable from one another and/or pivotable and/or displaceable relative to one another. The attachment can be assembled hereby particularly easily on the vehicle wheel. First the initial mounting segment can be fastened to the vehicle wheel, wherein the initial mounting section can be assembled easily on the vehicle wheel even with a flat tyre due to its radial extension, which is smaller than the radial extension of the tread section. Following this, a first segment of the tread section can be fastened to the vehicle wheel or to the initial mounting section and to the vehicle wheel. The vehicle wheel with the initial mounting section located thereon and the first segment of the tread section can then be rotated so that the segment of the tread section already located on the vehicle wheel contacts the road. Then the other segment of the tread section can be applied to the vehicle wheel and the initial mounting section and fastened. The attachment is then fully assembled, the assembly being easily possible without a car jack or lifting platform and with the vehicle wheel attached to the vehicle.

It is advantageous in particular if the first circumferential segment has a circumferential extension of more than 180°, in particular of more than 190°. The circumferential extension of the first circumferential segment of more than 180° or more than 190° has the advantage that the first circumferential segment forms the predominant part of the attachment in a circumferential direction and can thus easily be affixed stably and firmly to the vehicle wheel. In particular, the first circumferential segment can be designed in the shape of a circular arc and comprise a strut preferably running in the manner of a chord. A particularly high stability and simple affixing of the attachment on the vehicle wheel is provided hereby. An attachment of this kind with a first circumferential segment and a second circumferential segment can also comprise one or more contact sections, which are arranged facing the rim.

It is also possible in the meaning of the invention if the tread section comprises two circumferential segments with a circumferential extension of 180°, whereby the circumferential segments can be executed substantially of identical construction and can be manufactured very cost-efficiently.

In the end position, the clamping device rests preferably completely with the rear grip section positively on the inside of the rim flange. Due to an optional coating (e.g. rubber coating) of the clamping device on the side facing the rim flange, pressing (coating is compressed) can be achieved between the clamping device and rim flange. The circumferential forces caused by acceleration and braking operations can then be taken up particularly well thereby. A relative movement between the spare wheel and vehicle rim can thus be avoided especially efficiently.

The clamping device preferably generally has a friction-enhancing and/or compressible contact surface, in particular with a coating, for contacting the rim flange.

The attachment preferably generally comprises a contact section, which is designed to actuate the clamping device and to bring it into engagement behind the section of the rim, preferably the rim flange, when the contact section is actuated, in particular acted upon by a force, the contact section preferably being arranged on the side of the attachment facing the vehicle wheel when the attachment is fastened to the vehicle wheel. A secure fastening of the attachment can be achieved hereby in a simple manner. In particular, when the contact section is arranged on the side of the attachment facing the vehicle wheel, the contact section can be contacted virtually automatically by the rim, for example, when the attachment is affixed to the vehicle wheel and a force can be exerted hereby on the contact section, whereby the clamping devices are brought into engagement behind the section of the rim, preferably the rim flange. The contact section is preferably arranged and designed so that the force for actuation is directed at least partially, preferably predominantly in an axial direction. The contact section is preferably arranged on the part of the attachment that comprises the clamping device or devices. The tread section at any rate preferably comprises one or more clamping devices for engaging behind the rim flange and one or more contact sections. It is also possible that the initial mounting section, additionally or alternatively hereto, comprises one or more clamping devices and if applicable one or more contact sections.

The contact section is preferably arranged on the tread section and is designed and arranged so that when the tread section is affixed to the vehicle wheel, the vehicle wheel, in particular the rim of the vehicle wheel, or the initial mounting section is contacted and is actuated by this contact. It is also in the meaning of the invention if a contact section is arranged on the initial mounting section and designed so that when the initial mounting section is affixed to the vehicle wheel, the vehicle wheel, in particular the rim of the vehicle wheel, is contacted and actuated by this contact. An automatic clamping fastening of the respective part of the section on the rim flange can virtually occur hereby when the initial mounting section and tread section or a part of the tread section are affixed to the vehicle wheel. The corresponding assembly is therefore configured very simply and reliably.

The clamping device is preferably formed by a pivoted hook element with a rear grip section, the rear grip section being designed so that it engages behind the rim flange of the rim when the clamping device is in engagement behind the rim flange.

Preferably arranged on the hook element is an actuation section, which is connected rigidly to the rear grip section and preferably designed integrally with this. The actuation section is preferably arranged radially inwards with reference to the pivot axis of the hook element. The rear grip section for engaging behind the rim flange can be arranged radially outwards with reference to the pivot axis of the hook element. It is also conceivable that the rear grip section for engaging behind the rim flange is arranged radially inwards with reference to the pivot axis of the hook element. The pivoted hook element represents a particularly robust and easy to manufacture embodiment of the clamping device, which makes the corresponding attachment particularly economical to produce and with particularly low susceptibility to malfunctions. The hook element is preferably preloaded in one position, for example via a spring.

The actuation section is preferably arranged on the hook element and designed in such a way that the distance of its surface seen in a second radial direction from the pivot axis decreases continuously in a second circumferential direction about the pivot axis. The actuation section is preferably designed and arranged so that in a first pivot position of the hook element, in which the hook element does not engage behind the rim flange, a first section of the actuation section that is directed towards a contact partner, for example the rim or a contact element, which will be discussed later, forms the part of the actuation section that is furthest away from the pivot axis. Wherein in a second pivot position of the hook element, in which the hook element engages behind the rim flange with the rear grip section, a second section of the actuation section directed towards the contact partner, for example the rim or the contact element, forms the part of the actuation section located closest to the pivot axis.

The attachment preferably has a contact element on which the contact section is arranged, the contact element being designed separately from the clamping device and being arranged displaceably or pivotably in an axial direction on the attachment, in particular on the tread section. The contact element, for example, can hereby be designed displaceably in an axial direction, whereby damage to the rim is avoided if possible, while the clamping device or the hook element is pivotable. The hook element and contact element are preferably arranged so that the contact element contacts the rim with the contact section when the attachment is affixed to the rim, whereby the contact element is displaced in an axial direction with reference to the attachment and contacts the actuation section of the hook element, whereby the hook element pivots and is brought with its rear grip section into engagement behind the rim flange of the rim. The contact element is preferably designed so that in the state in which the hook element already engages behind the rim flange with the rear grip section, the hook element latches against pivoting out from this engagement position. It is also conceivable that the hook element has an actuation section in the form of an extension, which engages in a recess on the contact element or the contact element has an extension, which engages in a recess on the hook element.

The contact element and the hook element are preferably designed separately from one another.

The contact element and the hook element are preferably designed without teeth and preferably interact by direct contact with one another. Without teeth means in this case that the two elements have no toothing as in the case of a toothed wheel or a toothed rack. The contact element and hook element hereby interact particularly robustly and can be assembled in a simple manner.

The contact element and the hook element are preferably designed, arranged in relation to one another and coupled to one another in such a way that a translatory movement of the contact element, which is caused when the attachment is affixed to the vehicle wheel due to contact with the rim, causes a pivot movement of the hook element.

The attachment preferably comprises a locking mechanism, which is designed and arranged to lock the clamping device, in particular its pivoted hook element, when it is located in engagement behind the rim flange, preferably wherein the locking mechanism comprises a preferably preloaded, in particular spring-preloaded, latching element. It is preferred if the latching element engages in a latching manner in the hook element or the hook element engages in a latching manner in the latching element when the locking mechanism locks the clamping device. The fastening of the attachment on the rim is especially secure hereby. In particular, the latching element can be implemented in the form of a bolt, which is in particular preloaded via a spring, wherein the pivoted hook element can have a recess, for example, in which the preloaded bolt engages and locks this when the hook element is pivoted into the engagement position behind the rim. To this end this recess is advantageously arranged so that it pivots in the engagement position over the latching element, so that the latching element can enter the recess.

The locking mechanism is preferably designed to contact the road with a securing section when the attachment is affixed to the vehicle wheel and the vehicle wheel is rotating and thereby to actuate the securing section, in particular to act upon it with a force directed radially inwards, wherein the locking mechanism is designed so that a securing element is moved upon actuation of the securing section into a securing position, in which it is held positively and preferably from which it is only detachable by means of a tool, wherein in the securing position the securing element locks the clamping device positively in the engagement position behind the rim flange. It is hereby ensured virtually automatically that the clamping device is locked when the vehicle wheel is moved.

The clamping device preferably comprises a casing and is in particular designed as a prefabricated component, wherein the locking mechanism is preferably also arranged in the casing. The locking mechanism and the clamping device, and preferably the contact element can thus be arranged, at any rate partially, in a casing that forms a type of housing for these components. It is preferred if this casing or this housing can be assembled individually with the components located therein and then the ready-preassembled unit can be mounted as a prefabricated part on the attachment, in particular on the tread section.

The locking mechanism preferably comprises a latching element, which is implemented so that in the state in which it locks the hook element of the clamping device, it has fully entered the casing of the locking mechanism. The latching element is preferably arranged and designed so that it protrudes from the casing with a section when the hook element is not in the position in which it engages behind the rim flange and the hook element is not locked by the latching element. The latching element is preferably designed in the form of a bar and one end locks the hook element while its opposite end protrudes if applicable from the casing when the bar-like latching element does not lock the hook element. The protruding section is preferably executed with a signal colour, for example red. The section protruding from the casing is preferably visible from the side of the attachment facing away from the vehicle wheel, when looking in axial direction A. The attachment thus comprises a visual check of whether the clamping devices have been fully pivoted into engagement behind the rim flange.

The initial mounting section preferably comprises at least one, preferably pin-like, guide projection extended in an axial direction and the tread section comprises at least one guide opening, which is designed complementary to the guide projection, so that, when the initial mounting section has already been affixed to the vehicle wheel, the tread section or a part of the tread section can be placed onto the initial mounting section in such a way that the guide projection engages in the guide opening and an axial assembly movement of the tread section relative to the initial mounting section and the vehicle wheel is guided by the engagement of the guide projection in the guide opening. The tread section can hereby be attached to the vehicle wheel in a particularly simple and efficient manner when the initial mounting section is already fastened on the vehicle wheel. It is also conceivable that the initial mounting section has one or more guide openings and the tread section has corresponding pin-like guide projections, which are designed complementary to the guide openings. Due to the complementary design of guide opening and guide projection and their extension in an axial direction, the tread section can be placed in an axial direction in a simple manner onto the initial mounting section, which is already fastened on the vehicle wheel. Both the correct orientation and the correct assembly position of the tread section is virtually predetermined hereby.

The initial mounting section preferably comprises several struts extending radially outwards, which each have at least one guide projection. It is hereby possible that the guide projections are arranged at particularly suitable positions for attachment of the tread section. It is also conceivable that the struts have guide openings instead of guide projections to receive guide projections on the tread section.

The tread section is preferably fastenable on the initial mounting section via a fastening device, in particular detachably, preferably wherein the fastening device is designed so that the tread section moves upon fastening on the initial mounting section in an axial direction towards the rim, preferably wherein the fastening device comprises a screw connection, upon tightening of which the tread section moves in the axial direction towards the initial mounting section, preferably wherein the fastening device at least supports the movement of the tread section in an axial direction in an electrically and/or pneumatically driven manner and/or by preloading, in particular spring preloading. The tread section can hereby be affixed in a precisely defined manner on the initial mounting section. Assembly is especially simple in particular with the aforesaid supported movements of the tread section.

As already mentioned above, it is optional if the tread section is designed detachably from the initial mounting section. The initial mounting section can then be fastened on the rim of the vehicle wheel and then the tread section can be fastened on the initial mounting section. It is preferable in this case if the tread section has a connecting section, which extends preferably over the region of the bolt pattern when the tread section is fastened on the initial mounting section and which is designed to overlap with the initial mounting section when viewed in an axial direction, so that the tread section can be connected in a simple manner to the initial mounting section, for example by bolting.

The fastening device is preferably designed so that the tread section moves in an axial direction towards the rim when fastened on the initial mounting section. For example, the fastening device can be designed in the form of a web-like strut and screws, wherein the strut is provided on the tread section and has openings to receive screws, for example, which can be screwed into the initial mounting section. The tread section can thus be screwed onto the initial mounting section, wherein on tightening of the screws the tread section moves towards the rim.

A drive that can be designed as an electric motor can be provided on the attachment. The drive can comprise an energy source that can be implemented as a battery. The drive can be integrated non-detachably in the initial mounting section or implemented removably. In addition to or instead of the energy source, the drive can also comprise a connection to an external power source, for example a cigarette lighter of the vehicle.

The drive is used to actuate the fastening device. On actuation of the fastening device, the tread section moves in the axial direction towards the rim when fastened on the initial mounting section.

A gear motor can be provided, for example, which is pluggable or usable in another way for several screws or fastening devices, or an integral gear motor can be present for each screw or fastening device.

The attachment preferably has two drives, which can each actuate a fastening device, by means of which each circumferential segment of the tread section is movable in the axial direction towards the initial mounting section. The drive preferably has a tool attachment point, via which it can be operated manually in the absence of an energy supply, for example using a spanner.

The fastening device can also comprise a torque limiter. It is generally advantageous if the fastening device is designed as a screw connection with a defined tightening torque of the screw connection.

An integrated drive in the fastening device can also provide additional security against loosening of the screw connection via strong self-locking of the drive.

A voltage supply can be provided, for example, via the vehicle (e.g. the cigarette lighter) or also via a suitable external current source (for example, an external battery).

The tread section preferably comprises several spoke-like struts, which are preferably extended in a radial direction and spaced by gaps, preferably wherein the gaps have a circumferential extension, at least with regard to a radius about the axis of rotation of the vehicle wheel, which is greater, preferably at least three times as great, as the circumferential extension of the struts. The attachment according to the invention is particularly light due to this and can be manufactured in a material-saving manner.

The initial mounting section is preferably designed to be fastened on the vehicle wheel via positive rear gripping of a gripping device and/or via frictional engagement of the gripping device with a, preferably circular, opening in the rim that is arranged in the region of the bolt pattern, wherein the opening is arranged in the rim spaced at a distance from holes provided to receive wheel bolts or stay bolts in the rim, preferably wherein the opening is a centre opening in the rim or is spaced from a rotary axis of the rim, preferably wherein at least a part of the gripping device is connected non-detachably to the initial mounting section. The initial mounting section can hereby be fastened particularly easily on the vehicle wheel. In particular, it is advantageous if the opening in the region of the bolt pattern is a so-called poly-control hole. The initial mounting section of the appropriately designed attachment can be quasi inserted into these openings and then the tread section can be affixed to the initial mounting section.

The initial mounting section can comprise a gripping device, which is designed for frictional engagement in the preferably circular opening in the rim, which opening is arranged in the region of the bolt pattern and is preferably a poly-control hole. For example, the gripping device can comprise a pin-like element that is expandable in diameter. The pin-like element can be designed in particular so that in the fully inserted state it ends inside the poly-control hole, thus does not extend completely through this.

The gripping device preferably comprises an expandable section, which is preferably designed to engage behind the opening in the region of the bolt pattern and/or the gripping device comprises a compressible section, which is designed to be guided in the compressed state through the opening in the region of the bolt pattern and to expand in an uncompressed state when it is guided through the opening. An expandable section can in this case be a sleeve, for example, which can be spread out by the introduction of a spreading element. A gripping device of this kind can be arranged on the initial mounting section, for example. When the initial mounting section is affixed, the gripping device in the form of the spreadable sleeve can then be inserted into the poly-control hole, for example, and a spreading element can then be inserted into the spreadable sleeve to spread this out so that it engages behind the poly-control opening. It is also conceivable that the gripping device as stated above comprises a compressible section. This is compressed on introduction into the poly-control hole and then expands autonomously when led through the poly-control hole, and then engages behind this. The variants just described enable a simple placement of the initial mounting section for fastening. The assembly of the attachment is simplified.

"Arranged in the region of the bolt pattern" also means in this case at least that the opening differs from the gaps between the spokes of the rim. Such an opening can be in particular a so-called poly-control hole.

The gripping device can be designed, for example, in the form of a split sleeve, especially when it is designed to engage in the centre opening of the rim. An element with a varying radial extension, in particular a cone element, can be arranged in the interior of the split sleeve and is movable in an axial direction relative to the split sleeve. Due to the axial movement of the element, the split sleeve can be spread so that it engages frictionally in the opening or the centre opening. The element can be movable, for example, via a screw in an axial direction relative to the split sleeve. A plurality of spreadable arms can also be meant in this case by the split sleeve.

The gripping device is optionally designed as part of the initial mounting section. In other words, it can be connected non-detachably to the initial mounting section.

The gripping device can be designed as an in particular bar-shaped extension, which can comprise a hook region, wherein the extension is designed to be inserted into the opening. The hook region can be designed to be extendable or spreadable, for example, so that when it is led through the opening it can engage positively behind the rim.

The hook region can also be designed to be compressible. The hook region can then be reduced in its diameter when led through the opening and expand autonomously when it is led through the openings, so that it can engage behind the rims virtually automatically. To this end the hook region can be designed to be reversibly compressible, resilient and/or spring-mounted, for example.

In one embodiment, the gripping device comprises an expandable section, which is designed to engage behind the opening in the region of the bolt pattern. An expandable section of this kind can be formed by a hook region, for example, which is designed to be spreadable. For example, the gripping device can comprise two hook arms, which can be moved away from one another for example by screwing in a spreading element, for example a screw, and can thus be spread.

The gripping device can be designed in particular also in the manner of a hollow pin, wherein it can comprise a spreading element on the inside, in particular an expanding pin, which widens the expandable section by movement in an axial direction. Preferably several gripping devices are arranged on the initial mounting section. If the gripping devices are designed in the manner of a hollow pin as just described, for example, the expanding pins or spreading elements possibly present can be connected to one another, and preferably be movable jointly in an axial direction, for example by an actuating unit designed as a screw, for example, to widen the expandable sections.

The initial mounting section can be designed in particular so that it comprises in its diameter compressible plug-in elements, which are insertable into the aforesaid opening, in particular poly-control hole, of the rim, wherein they are reducible in their diameter on insertion. The plug-in elements can be designed to engage behind the opening or to engage frictionally in this. The initial mounting section preferably has a spreading element, which either spreads the plug-in elements and/or prevents them from being compressed in diameter when it is inserted into the plug-in elements. The latter variant is sensible in particular when the plug-in elements are designed to reduce in diameter on insertion into the poly-control hole and to widen in the fully inserted state and to engage behind the poly-control hole or opening.

The spreading elements are preferably affixed to the initial mounting section in such a way that the initial mounting section can be affixed in one piece on the vehicle wheel and the plug-in elements can be inserted into the openings, in particular poly-control holes, of the rim, wherein the spreading elements are not yet, or not yet fully, inserted into the plug-in elements. The spreading elements are preferably locked in this not fully inserted position in the initial mounting section. On release of the locking it is preferably possible, by further pressure on the initial mounting section, to move a part of the initial mounting section preferably in an axial direction and hereby to insert the unlocked spreading elements fully into the plug-in elements, in order to fix the plug-in elements firmly in the openings by positive rear engagement or frictional engagement.

The initial mounting section can be designed in particular so that it comprises in its diameter compressible plug-in elements as gripping devices, which are insertable into the aforesaid opening(s), in particular poly-control hole, of the rim, wherein they are reducible in their diameter on insertion. The plug-in elements can be designed to engage behind the opening or to engage frictionally in this. The initial mounting section preferably has a spreading element, which either spreads the plug-in elements and/or prevents them from compressing in diameter when it is inserted into the plug-in elements. The latter variant is sensible in particular when the plug-in elements are designed to reduce in diameter on insertion into the poly-control hole and to widen in the fully inserted state and to engage behind the poly-control hole or opening.

The spreading elements are preferably affixed to the initial mounting section in such a way that the initial mounting section can be mounted in one piece on the vehicle wheel and the plug-in elements can be inserted into the openings, in particular poly-control holes, of the rim, wherein the spreading elements are not yet, or not yet fully, inserted into the plug-in elements. The spreading elements are preferably locked in this not fully inserted position in the initial mounting section, for example locked via a locking device. On release of the locking by the locking device it is preferably possible, in particular by further pressure on the initial mounting section, to move a part of the initial mounting section preferably in an axial direction and hereby to insert the unlocked spreading elements fully into the plug-in elements, in order to fix the plug-in elements firmly in the openings by positive rear engagement or frictional engagement.

The initial mounting section preferably has a first axial part and a second axial part. The plug-in elements are preferably arranged on the first axial part and the spreading elements on the second axial part. The two axial parts are initially spaced from one another and locked via the locking device in this spaced position. The initial mounting section with the two axial parts can then be affixed to the vehicle wheel, wherein the plug-in elements are inserted into the openings. The locking device is then unlocked and by further pressing against the initial mounting section, the second axial part is moved towards the first axial part and the spreading elements enter the plug-in elements, in order to fix the plug-in elements firmly in the openings by positive rear engagement or frictional engagement. The insertion of the spreading elements can also be realisable in another manner, however. The first axial part is preferably arranged between the vehicle wheel and the second axial part in an axial direction.

The initial mounting section is preferably designed so that the initial mounting section with plug-in elements and spreading elements can be affixed to the vehicle wheel, wherein the plug-in elements are inserted into the openings and in a second step the spreading elements are actuated via a suitable actuation mechanism and can be inserted into the plug-in elements, in order to fix the plug-in elements firmly in the openings by positive rear engagement or frictional engagement.

Alternatively or in addition to the plug-in elements and spreading elements just described, the initial mounting section can also be fastenable on the rim via clamping devices, which are designed to engage behind the rim flange. The clamping devices are formed in this case preferably by hook elements, which are arranged easily pivotably on sliding elements. The hook elements can also be arranged rigidly on the sliding elements, however. The sliding elements have preferably pin-like projections, on which the hook elements are affixed in a pivoted manner. The sliding elements themselves can be affixed to a crosswise structure of the initial mounting section so as to be displaceable in a translatory manner in a radial direction. The crosswise structure can have several struts extending radially outwards, preferably three such struts. The sliding elements or at least one of the sliding elements can be fixable in its position relative to the crosswise structure or the struts by way of fixing means designed as screws, for example. Once the initial mounting section has been fastened to the vehicle wheel, the tread section or the circumferential segments can be fastened to the initial mounting section in a different manner. Various types of fastening are conceivable here, for example via the fastening device described above.

The movement of the sliding elements can preferably be realised by an angle drive or by means of a clamping lever or by another traction device.

The initial mounting section can be adapted to different rim diameters by stopping the sliding elements in different positions.

In the case of an initial mounting section as just described, it is conceivable that the tread section has no clamping devices of its own. However, it can also have additional clamping devices of its own. In such a variant, the initial mounting section can first be hooked behind the rim flange by clamping devices lying underneath, for example. The clamping devices lying underneath are already stopped in their position relative to the struts here. Then a strut of the initial mounting section directed upwards, for example, is likewise placed on the rim so that the upper clamping device can be moved with the corresponding sliding element, to which it is fastened, in a simple manner via the traction device towards the rim flange, so that it can engage behind this. The sliding element or the clamping device is then stopped by means of the fixing means relative to the corresponding strut.

The first circumferential segment of the tread section is then fastened first to the initial mounting section. The vehicle wheel is then rotated so that the first circumferential segment of the tread section contacts the road. And in a last step, the second circumferential segment of the tread section is affixed to the initial mounting section.

In the case of an initial mounting section such as just described, it is also possible to first fasten the initial mounting section on the vehicle wheel. In a next step it is then possible to drive with the damaged vehicle wheel onto a small wedge-shaped ramp, so that the vehicle wheel with the flat tyre is lifted from the road. The initial mounting section can also be fastened on the vehicle wheel when the vehicle is already standing on the ramp. Even a tread section designed integrally in a circumferential direction can then be placed in a very simple manner onto the initial mounting section braced on the vehicle wheel or on the rim.

The tread section can optionally comprise an inner section designed continuously in a circumferential direction, which is arranged lying radially inside an outer section, wherein the outer section is designed with a gap in the circumferential direction, and wherein the outer section further comprises an insertion section which, when the attachment is in the assembled state on the vehicle wheel, is received in the gap such that the outer section has a closed circular tread. Since the outer section has the gap in a circumferential direction, it is possible to affix the initial mounting section and the tread section without the insertion section on the vehicle wheel without removing the vehicle wheel from the vehicle or lifting the vehicle using a jack. To this end the initial mounting section can be fastened on the vehicle wheel in one of the ways described above, for example. The gap in the outer section of the tread section is then oriented towards the ground and the tread section fastened to the initial mounting section. When the initial mounting section and the tread section are affixed to the vehicle wheel, the vehicle can be moved slightly. The gap then moves due to the rotation of the vehicle wheel away from the orientation towards the ground. For example, the vehicle can be moved forwards by half a rotation of the vehicle wheel, the gap is then no longer oriented towards the road, but points upwards. The insertion section can now be inserted into the gap and taken up. The attachment then has a closed circular tread in a circumferential direction. The assembly of the attachment can then be completed or the attachment can be fastened further via additional means (for example clamping devices) on the vehicle wheel.

The tread section preferably comprises an annular portion, which is preferably arranged in the outer radial region. The annular portion can be designed in multiple parts in a circumferential direction. It is preferably designed in multiple parts in a circumferential direction corresponding to the circumferential segments of the tread section that may be present. The annular portion can preferably be affixed to a main part of the tread section in an axial direction such that a tread coating, which forms the tread of the attachment, is held frictionally and/or positively between the main part and the annular portion of the tread section. The annular portion can be affixed for this purpose on the main part, for example, via a screw connection.

The tread section is preferably executed with a cast tread, preferably of a castable polymer. The tread is thus preferably cast onto the tread section.

The tread can also be clamp-attached to the tread section. The clamping is preferably of such a kind that in normal driving operation no relative movements take place between the tread and the rest of the tread section. The clamping can preferably be adjusted, however, so that in extreme acceleration or extreme braking operations, a relative movement takes place between the tread and the rest of the tread section.

It is optional if the attachment comprises a tyre displacement device, which is designed to move the tyre in an axial direction away from the rim flange when affixing the attachment, and/or when fastening the tread section to the initial mounting section and/or when actuating the clamping device. The clamping devices hereby have free access to the rim flange.

It is optional if the tyre displacement device is designed separately from the clamping device. It is also conceivable that the tyre displacement device is formed by the clamping device or a section of the clamping device or comprises this.

It is optional if the locking mechanism is designed so that the securing element, when moved into the securing position, additionally braces the rear grip section of the clamping device, which is in engagement behind the section of the rim, against the section of the rim.

It is preferred if the securing element has a movable clamping surface, which is designed and arranged to engage behind a section of the clamping device that is designed preferably in the manner of a projection, in particular pin-like, and to act upon it with a force such that the rear grip section of the clamping device is pushed into the engagement position behind the section of the rim of the vehicle wheel and is braced in this rear engagement when the locking mechanism is transferred to the securing position.

An independent invention is also an attachment, which has a basic body with a tread, wherein the basic body can correspond to one of the embodiments of the tread sections described above, and preferably wherein the attachment additionally comprises one or more embodiments of the previously described clamping devices, and preferably one or more embodiments of the locking mechanism. Such an attachment must not necessarily comprise the initial mounting section of the previously described embodiments, therefore.

An independent aspect of the present invention is a system of an attachment and a rim of a vehicle wheel, wherein the attachment can have the features described above and below or can be designed according to one or more of the embodiments described above and below and the rim has at least one opening, preferably several openings, which is or are arranged in the region of the bolt pattern in the rim, and wherein the opening is or are arranged preferably spaced at a distance from the holes that are provided for receiving wheel bolts or stay bolts and preferably from the centre openings of the rim. The openings described can be poly-control holes, but can also be other openings specially provided for fastening the attachment.

The centre points of the openings are preferably arranged spaced at a distance, preferably spaced at a distance radially outwards, to a circle that runs through centre points of the holes provided to receive wheel bolts or stay bolts, and/or the centre points of the openings are arranged spaced at a distance, preferably spaced at a distance radially inwards, to a circle that forms the smallest circle that circumscribes all holes provided for receiving wheel bolts or stay bolts.

Part of the present invention is also a set of an attachment according to one or more of the aforesaid embodiments and a drive-on element. The drive-on element is preferably designed in the manner of a ramp, in particular with a plateau section, so that the vehicle driver can drive with the flat tyre onto this drive-on element and then reaches the plateau section, on which he can safely stop the vehicle. He can then affix the attachment of the set simply to the vehicle wheel.

BRIEF DESCRIPTION OF THE DRAWINGS

Other features, application options and advantages of the invention result from the following description of exemplary embodiments of the invention, which are explained with reference to the drawings, wherein the features can be substantial for the invention both alone and in different combinations without reference being made again explicitly hereto. In the drawings:

FIG. 4 includes FIGS. 4A to 4G, and shows the embodiment from FIG. 3 in other depictions;

FIG. 5 includes FIGS. 5A to 5D, and shows another embodiment of an attachment according to the invention;

FIG. 6 includes FIGS. 6A to 6F, and shows another embodiment of an attachment according to the invention;

FIG. 11 includes FIGS. 11A to 11C, and shows another embodiment of an attachment according to the invention;

FIG. 12 includes FIGS. 12A to 12F, and shows various sectional depictions of the attachment from FIG. 11;

DETAILED DESCRIPTION OF THE DRAWINGS

Figures 1, 2:
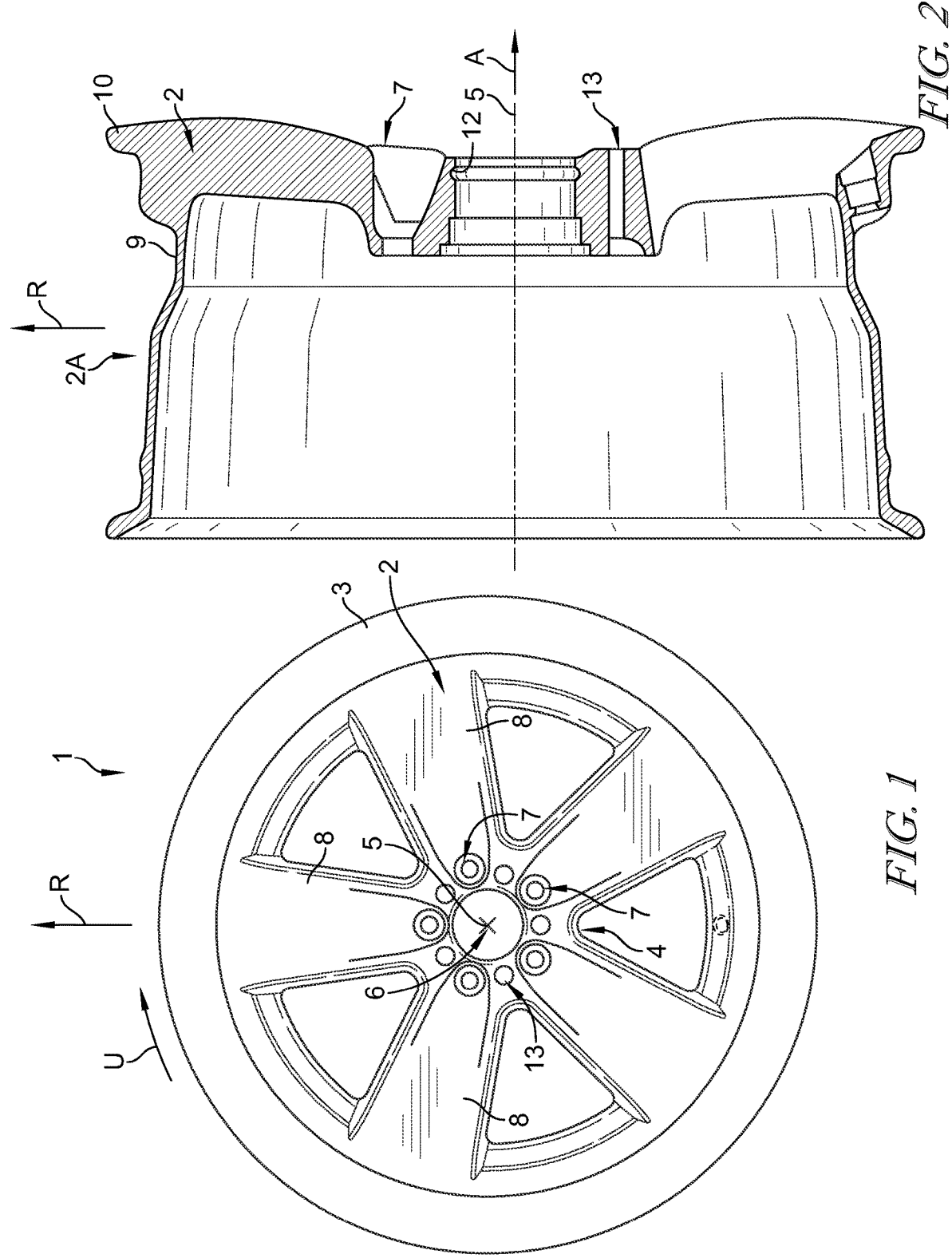
FIG. 1 shows a vehicle wheel viewed in an axial direction.
FIG. 2 shows a sectional representation of the rim of the vehicle wheel from FIG. 1.
Figure 3A:
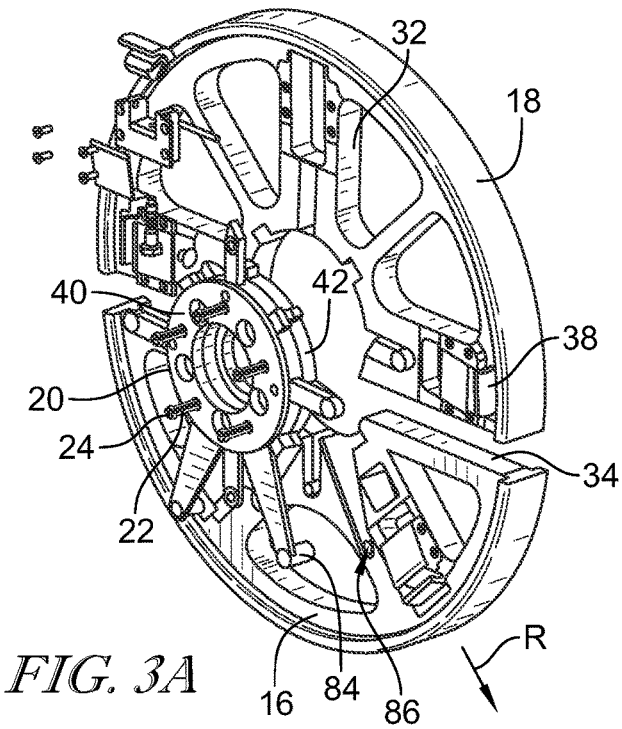
FIG. 3 includes FIGS. 3A to 3D, and shows a first embodiment of an attachment according to the invention.
Figure 3B:
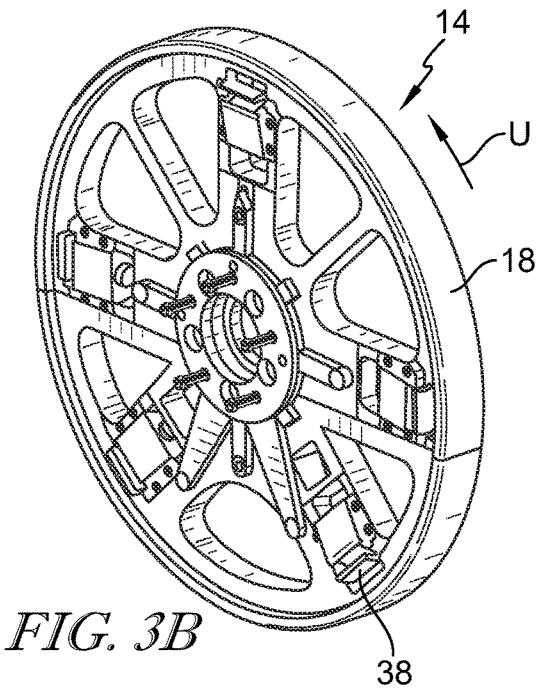
Figure 3C:
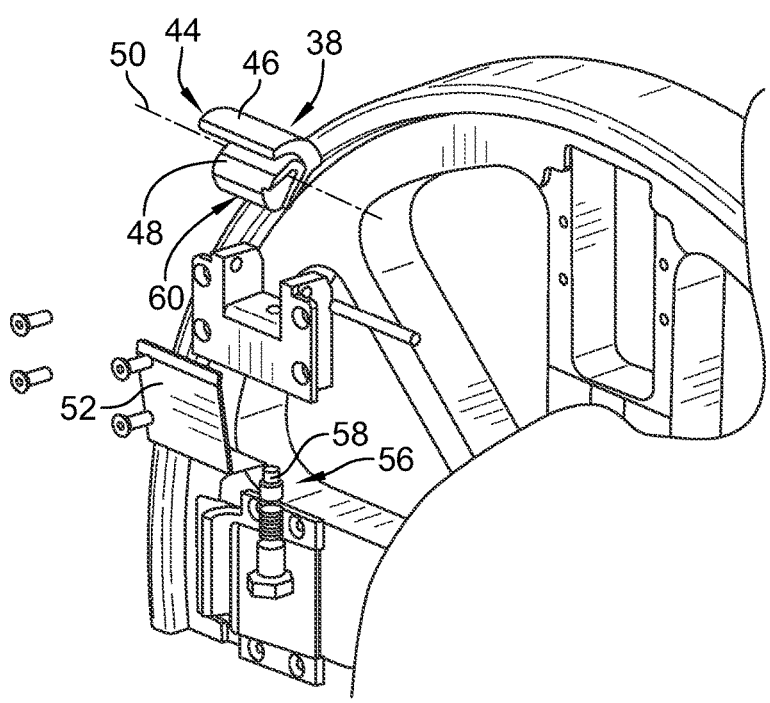
Figure 3D:
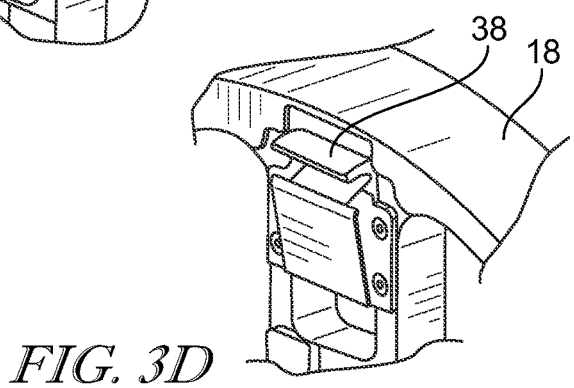

In the following figures, corresponding components and elements have the same reference characters. For greater clarity not all reference characters are reproduced in all figures.

FIG. 1 shows a schematic depiction of a vehicle wheel 1. The vehicle wheel 1 comprises a rim 2 and a tyre 3 mounted on the rim 2. The rim 2 is shown individually in FIG. 2 without the tyre 3.

A circumferential direction U is depicted by an arrow with the reference character U. An axial direction A is depicted by an arrow with the reference character A (FIG. 2). A radial direction R is depicted by an arrow with the reference character R.

Radially internally the rim 2 comprises a bolt pattern 4 of the vehicle wheel 1. Arranged in the centre of the bolt pattern 4 around a rotary axis 5 of the vehicle wheel 1 running along the axial direction A is a so-called centre opening 6, which is in some cases also termed a hub bore or centre hole centring.

Here the bolt pattern 4 comprises five screw holes 7, two of which are provided with a reference character. On the present vehicle wheel 1, five spokes 8 extend radially outwards from the region of the bolt pattern 4.

The rim 2 comprises a rim bed 9 and a rim flange 10 and the centre opening 6 has a recessed circumferential groove 12.

The rim 2 has several openings 13, which are arranged in the region of the bolt pattern 4. The openings 13 are arranged spaced at a distance in the rim 2 to the screw holes 7, thus holes 7 provided to receive wheel bolts or stay bolts, and to the centre opening 6 of the rim 2.

The openings 13 can be implemented as poly-control holes, for example, via which an axial play of the axle of the vehicle wheel 1 can be measured.

If the tyre 3 of the vehicle wheel 1 has a hole, the air in the tyre escapes and the tyre function of the vehicle wheel 1 is restricted. To enable continued driving operation in such a case, an attachment 14 according to the invention can be used.

An example of such an attachment is shown in FIG. 3. The attachment 14 is designed with a tread section 16, which comprises a tread 18 of the attachment 14, and with an initial mounting section 20, which is arranged on assembly of the attachment 14 radially inside the tread 18.

In the present case the tread section 16 is designed separately and detachably from the initial mounting section 20.

The initial mounting section 20 is designed to be fastened to the vehicle wheel 1 in the region of a bolt pattern 4 of a rim 2 of the vehicle wheel 1, in particular to be fastened via a positive rear engagement and/or a frictional connection in the region of the bolt pattern 4 of the rim 2.

The positive rear engagement in the present example is realised by means of one or more gripping devices 22. The gripping device 22 in the present example comprises an expandable section 24. The gripping device 22 is designed in the present example in the manner of a bolt or in the form of a spreadable sleeve 26. The gripping devices 22 designed as spreadable sleeves are designed and arranged to be inserted into the openings 13 on the rim 2 of the vehicle wheel 1.

The tread section 16 is designed here in multiple parts in the circumferential direction U, the tread section 16 preferably comprising, as here, a first circumferential segment 32 and a second circumferential segment 34. The attachment 14 further comprises clamping devices 38, which are designed to engage behind a section, preferably the rim flange 10, of the rim 2 (FIGS. 4B-4D). In the present example the clamping devices 38 are arranged on the tread section 16.

The initial mounting section 20 has a first axial part 40 and a second axial part 42. The gripping devices 22 are preferably fastened, as here, firmly to the first axial part 40, while affixed on the second axial part 42 are pin-like extensions 43, which are inserted into the spreadable sleeves 26 when the two axial parts of the initial mounting section 20 are pushed into or onto one another.

To fasten the attachment 14 to the vehicle wheel 1, first the first axial part 40 with the spreadable sleeves 26 is inserted into the openings 13. In the next step, the second axial part 42 is placed onto the first axial part 40 so that the pin-like extensions 43 are introduced into the spreadable sleeves 26, which are already located in the openings 13. The spreadable sleeves 26 are spread hereby and engage positively behind the openings 13. The initial mounting section 20 is fastened by a positive rear engagement on the vehicle wheel, as the gripping devices 22 engage behind the poly-control holes of the vehicle wheel.

The first circumferential segment 32 is next applied to the initial mounting section 20. The clamping devices 38 are each formed here by a pivoted hook element 44, which is braced in a first position in which it does not engage behind the rim flange 10, as shown in FIG. 4B.

The hook element 44 has a rear grip section 46, which is designed to realise the rear engagement with the rim flange 10. The hook elements 44 further comprise an actuation section 48, which is connected rigidly to the rear grip section 46. The rear grip section 46 is arranged radially externally with reference to the pivot axis 50. The actuation section 48 is arranged radially internally with reference to the pivot axis 50.

The attachment 14 comprises contact elements 52 formed as plates, which are arranged pivotably on the tread section 16. The pivoting capability of the contact elements 52 formed as plates is provided here by their elastic deformability. The contact elements 52 can also have a rubber coating on their side facing the vehicle wheel 1 in an axial direction A to protect the rim 2.

The contact elements 52 are designed and arranged to contact the rim 2 of the vehicle wheel 1 on assembly of the attachment 14 on the vehicle wheel 1. They are also designed to contact the actuation section 48 of the hook elements 44 upon contacting the rim 2.

The contact elements 52 thus each have a contact section 54, which is designed and arranged so that when the tread section 16 is affixed to the vehicle wheel, the vehicle wheel 1, in particular the rim 2 of the vehicle wheel 1, is contacted and actuated by this contact and a force is exerted on the contact section in an axial direction. Due to actuation of the contact section, the actuation section on the hook element is actuated in turn and the hook element 44 is pivoted about the pivot axis 50, so that the rear grip section 46 engages behind the rim flange 10 of the rim 2.

The attachment 14 further comprises a locking mechanism 56. The locking mechanism 56 comprises a latching element 58. In the present example the latching element 58 is implemented as a spring-preloaded bolt 59. If the clamping device or its hook element 44 is in the position in which the rear grip section 46 engages behind the rim flange, the latching element 58 engages in a corresponding recess 60 on the hook element 44. The engagement by the hook element 44 behind the rim flange 10 is illustrated clearly again in FIGS. 4D-4F.

A hook element 44 is shown individually and enlarged in FIG. 4G. FIG. 4G shows the hook element 44 in the position shown in FIG. 4F. The actuation section 48 is explained in greater detail. The actuation section 48 is preferably arranged on the present hook element 44 and designed so that the distance of its surface in a second radial direction R2 seen from the pivot axis 50 decreases continuously in a second circumferential direction U2 about the pivot axis 50.

The actuation section 48 is preferably designed and arranged, as in the version depicted in FIG. 4, so that in a first pivot position S1 (FIG. 4D) of the hook element 44, a first section 62 of the actuation section 48 directed towards a contact partner forms the part of the actuation section that is most remote from the pivot axis 50. In the first swing position S1 of the hook element 44, the hook element 44 does not engage behind the rim flange 10 with the rear grip section 46.

In the example of FIG. 4, the contact partner is the contact element 52, thus the resiliently designed plate. However, the contact partner can also be the rim, for example, or a differently configured contact element 52.

In the second pivot position S2 (FIG. 4F) of the hook element 44, the hook element 44 engages with the rear grip section 46 behind the rim flange 10. A second section 64 of the actuation section 48 directed towards the contact partner in this position forms the part of the actuation section 48 situated closest to the pivot axis 50 in this position.

The actuation section 48 extends from the first section 62 to the second section 64 and represents the face on the hook element 44 that is facing the contact partner or contacts this on pivoting due to contact with the contact partner, for example the contact element 52 or the rim 2. The distance of the surface of the actuation section to the pivot axis 50 decreases continuously from the first section 62 to the second section 64. Due to the continuous decrease in this distance, a movement of the contact element 52 in axial direction A can be converted into a pivot movement of the hook element 44.

In the example of FIG. 4, the rear grip section 46 is arranged radially outwards from the pivot axis 50, wherein the actuation section 48 is arranged radially inwards from the pivot axis 50.

FIG. 5 shows a variant in which the actuation section 48 and the rear grip section 46 are both arranged radially inwards from the pivot axis 50. In this case this view refers to the second pivot position S2 in which the rear grip section 46 is in rear engagement with the rim flange 10.

The attachment 14 of FIG. 5 also comprises the locking mechanism 56. The locking mechanism 56 comprises a latching element 58 as already explained in connection with FIG. 4.

The locking mechanism 56 of FIG. 5 is also designed to contact the road with a securing section 66 when the attachment 14 is affixed to the vehicle wheel 1 and the vehicle wheel 1 is rotating and thereby to actuate the securing section 66, in particular to act upon it with a force directed radially inwards. Here the securing section 66 is arranged in the tread 18.

The locking mechanism 56 is designed so that a securing element 68 is moved upon actuation of the securing section 66 into a securing position SP, which is shown in FIG. 58. In the securing position it is held positively, which is realised in the present case in FIG. 5 by a ribbed surface 70, which is guided by a plate 72 with a suitably executed opening 74. The ribbed surface 70 is implemented here with an asymmetrically designed arrangement so that it can be pressed in a direction directed radially inwards through the opening 74, but not in a direction directed radially outwards. The securing element 68 is preferably only detachable from the securing position SP by means of a tool. In the securing position SP, the securing element 68 locks the clamping device 38 positively in the rear grip position with the rim flange 10.

Another embodiment of the attachment 14 according to the invention is depicted in FIG. 6. The embodiment of FIG. 6 comprises a contact element 52 designed in the manner of a slide.

The contact element 52 is designed separately from the clamping device 38 and is arranged displaceably or pivotably in axial direction A on the attachment 14, in particular on the tread section 16.

The hook element 44 in this embodiment comprises an actuation section 48 in the form of an extension 76. The extension 76 engages in a recess 78 on the contact element 52. A translatory movement of the contact element 52 in axial direction A can be converted hereby into a pivot movement of the hook element 44 about the pivot axis 50.

The attachment 14 of FIG. 6 also comprises the locking mechanism 56. The locking mechanism 56 comprises in turn a latching element 58 as already explained in connection with FIG. 4 with the difference that the latching element 58 only interacts with the clamping device 38 and locks this indirectly. The locking takes place in that the latching element 58 locks the contact element 52 in a blocking manner, which in turn locks the extension 76 of the clamping device 38.

The contact element 52 has contact protection 80, which is executed here as a rubber coating. Such contact protection can also be provided directly on the clamping device 38, for example when the clamping device 38 itself comprises the contact section 54.

Figure 7A:
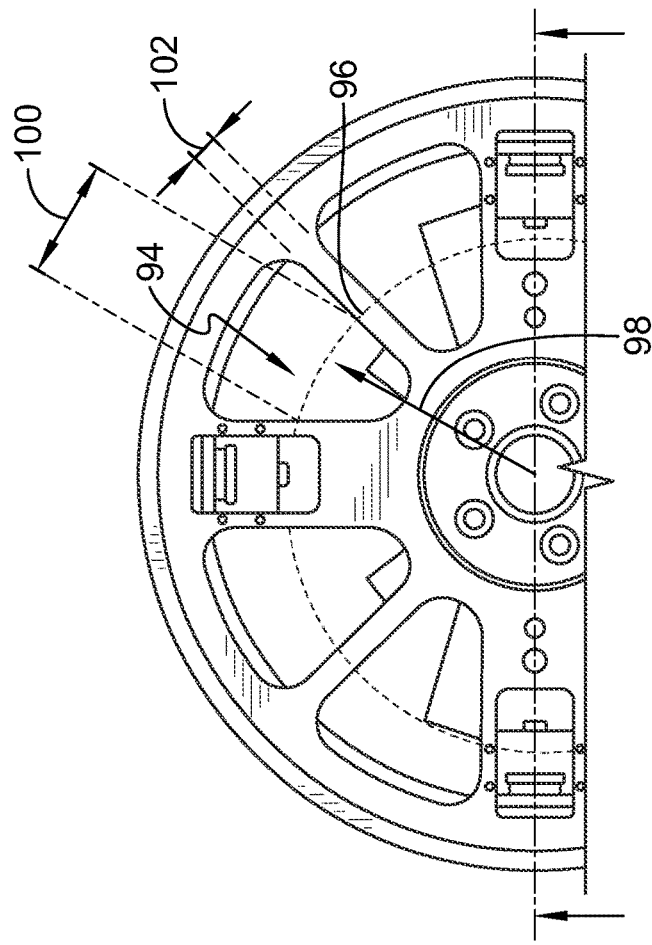
FIG. 7 includes FIGS. 7A to 7F, and shows another embodiment of an attachment according to the invention.
Figure 7C:
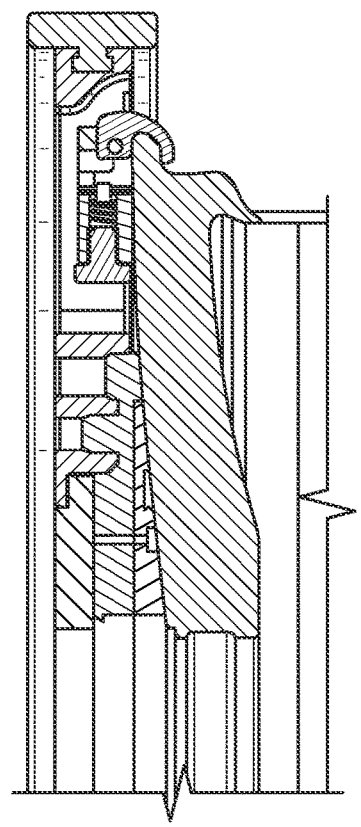
Figure 7B:
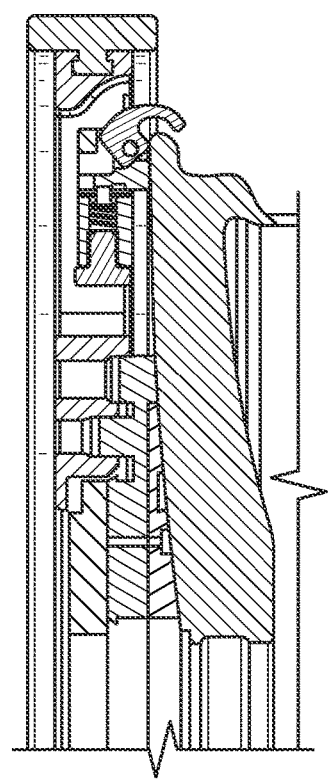

A further embodiment of the attachment 14 according to the invention is depicted in FIG. 7. In this embodiment the contact element 52 has a graduated coupling surface 82, which with the actuation section 48 of the hook element 44 interacts. The translatory movement of the contact element 52 directed in axial direction A can hereby be converted into a pivot movement of the hook element 44 about the pivot axis 50. The latching element 58 locks the clamping device 38 in the example of FIG. 7 again only indirectly, as in the example of FIG. 6.

FIG. 7F clearly shows the attachment 14 in the attached state on the vehicle wheel 1 and rim 2.

Figure 8:
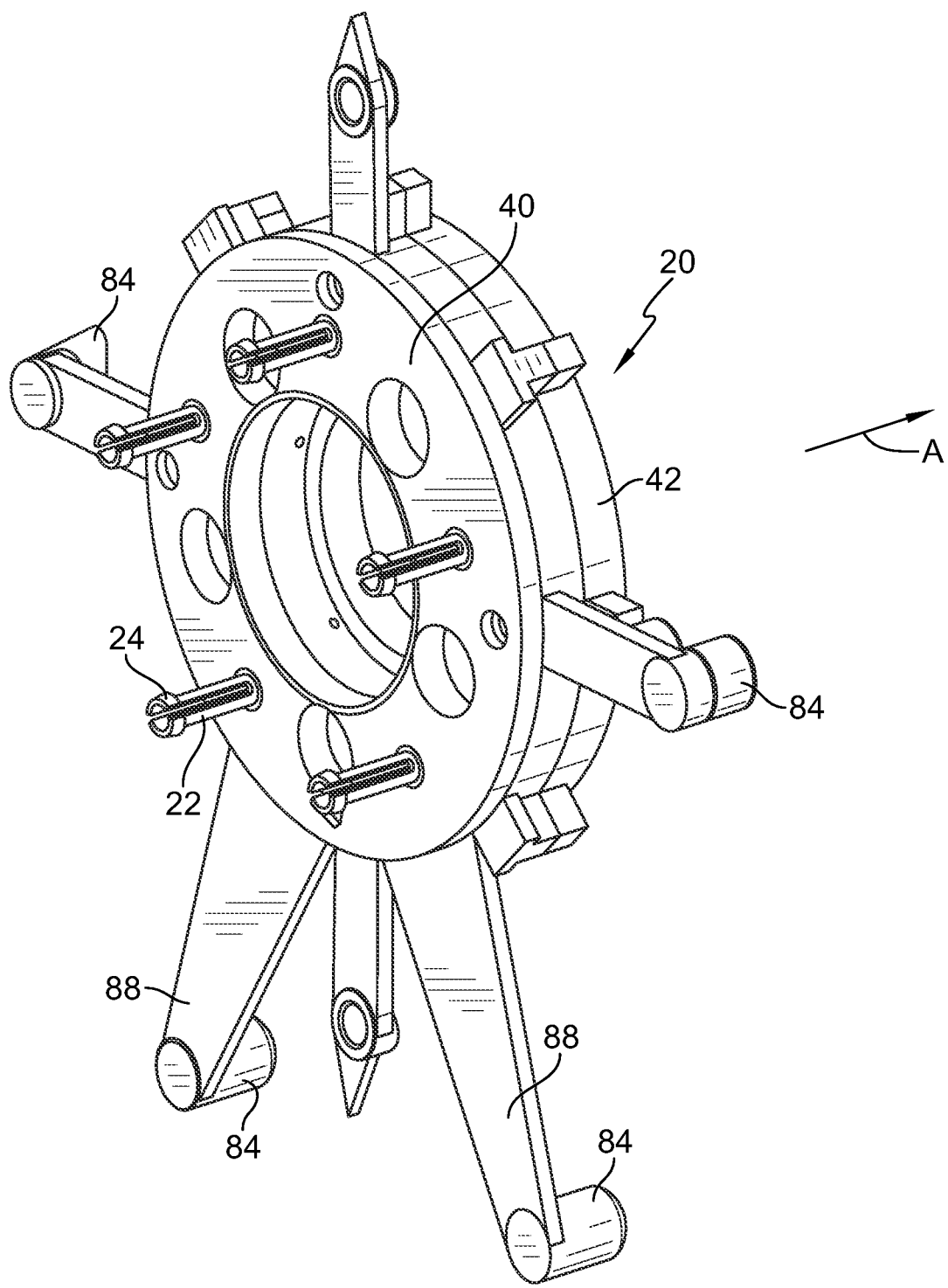
FIG. 8 shows the initial mounting section of the attachment from FIG. 3.

In FIG. 8 the initial mounting section 20 from FIG. 1 is depicted in detail. The initial mounting section 20 has several, preferably pin-like, guide projections 84 extended in an axial direction.

The tread section 16 has a guide opening 86 corresponding to each of the guide projections 84. The respective guide opening 86 is designed complementary to the guide projection 84, so that when the initial mounting section 20 is affixed to the vehicle wheel 1, the tread section 16 or a part or segment 32, 34 of the tread section 16 can be placed on the initial mounting section 20 such that the respective guide projection 84 engages in the guide opening 86 and an axial assembly movement of the tread section 16 relative to the initial mounting section 20 and the vehicle wheel 1 is guided by the engagement of the guide projection 84 in the guide opening 86.

The initial mounting section 20 has several struts 88 extending radially outwards, which each have at least one guide projection 84.

In the example of FIG. 4, it is clearly illustrated that the tread section 16 is fastened detachably to the initial mounting section 20 via a fastening device 90. The fastening device 90 is preferably designed so that the tread section 16 moves when fastened to the initial mounting section 20 in the axial direction A towards the rim 2. The fastening device 90 is designed in the example of FIG. 4 as a screw connection 92. On tightening of the screw connection, the tread section 16 is moved in the axial direction A towards the initial mounting section 20, which is already fastened on the vehicle wheel via the gripping devices 22. The fastening device 90 can also at least support the movement of the tread section 16 in axial direction A in an electrically and/or pneumatically driven manner and/or by preloading, in particular spring preloading. For example, a gear motor that is pluggable or usable in another way for several screws or fastening device 90 or an integral gear motor for each screw or fastening device 90 can be provided.

Figure 17:
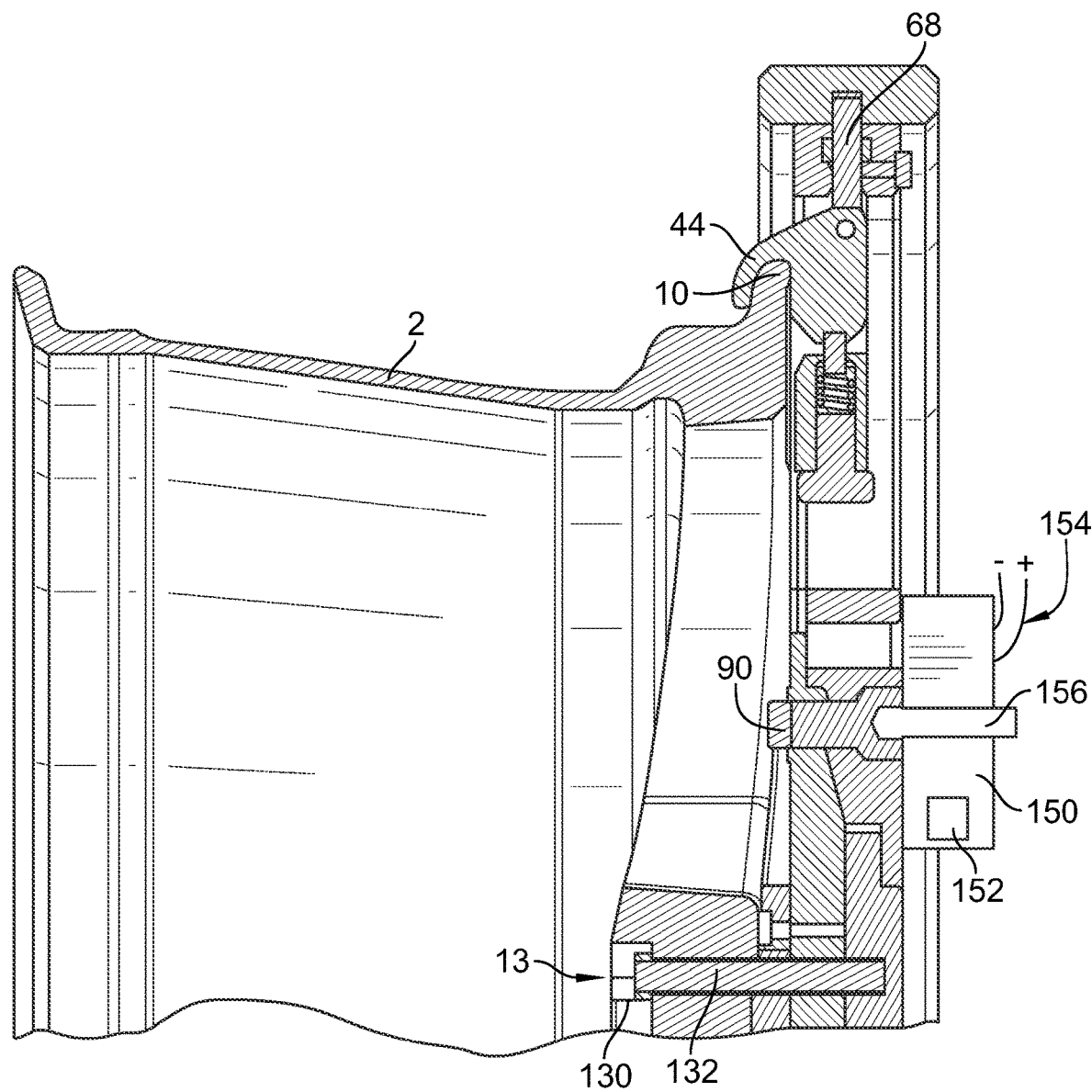
FIG. 17 an attachment with a drive for moving the tread section towards the initial mounting section.

In FIG. 17 an embodiment is shown that comprises a drive 150, which is designed in the present example as an electric motor. The drive 150 comprises an energy source 152, which is implemented as a battery. The drive 150 can be integrated non-detachably into the initial mounting section 20 or implemented removably. As well as or instead of the energy source 152, the drive also comprises a connection 154 to an external power source, for example a cigarette lighter of the vehicle.

The drive 150 serves to actuate the fastening device 90. On actuation of the fastening device 90, the tread section 16 moves in the axial direction A towards the rim 2 upon fastening to the initial mounting section 20.

The attachment 14 preferably has two drives 150, which can each actuate a fastening device 90, by means of which each circumferential segment 32, 34 of the tread section 16 is movable in the axial direction A towards the initial mounting section 20. The drive 150 has a tool application point 156, via which it can be operated manually, for example using a spanner, in the absence of an energy supply.

As illustrated in FIG. 7, the tread section 16 can comprise several spoke-like struts 96, which are preferably extended in a radial direction R and spaced by gaps 94, the gaps 94 preferably having a circumferential extension 100, at least with regard to a radius 98, that is greater, preferably at least three times as great, as the circumferential extension 102 of the struts 96.

FIGS. 9A-9F illustrate a variant of an initial mounting section 20. The initial mounting section 20 from FIGS. 9A-9F can be fastened on the rim 2 via clamping devices 38, which are designed to engage behind the rim flange 10. The clamping devices 38 are formed in the present case by hook elements 44, which are arranged to be easily pivotable on sliding elements 104. The hook elements 44 can also be arranged rigidly on the sliding elements 104, however. The sliding elements 104 have pin-like projections 106, on which the hook elements 44 are affixed in a pivoted manner. The sliding elements 104 themselves are affixed to a crosswise structure 108 of the initial mounting section 20 so as to be displaceable in a translatory manner in a radial direction R. The crosswise structure 108 has three struts 109 extending radially outwards. The sliding elements 104 can be fixed in their position relative to the crosswise structure 108 and the struts 109 via fixing means 110 designed as screws. When the initial mounting section 20 has been fastened to the vehicle wheel 1, the tread section 16 or the circumferential segments 32 and 34 can be fastened in a different manner to the initial mounting section 20. Various types of fastening are conceivable here, for example via the fastening device 90 described previously.

The movement of the sliding elements 104 can preferably be realised via an angle drive or by means of a clamping lever or by another traction device 160.

The initial mounting section 20 from FIGS. 9A-9I can be adapted to different rim diameters by stopping the sliding elements 104 in different positions.

Figure 9I:
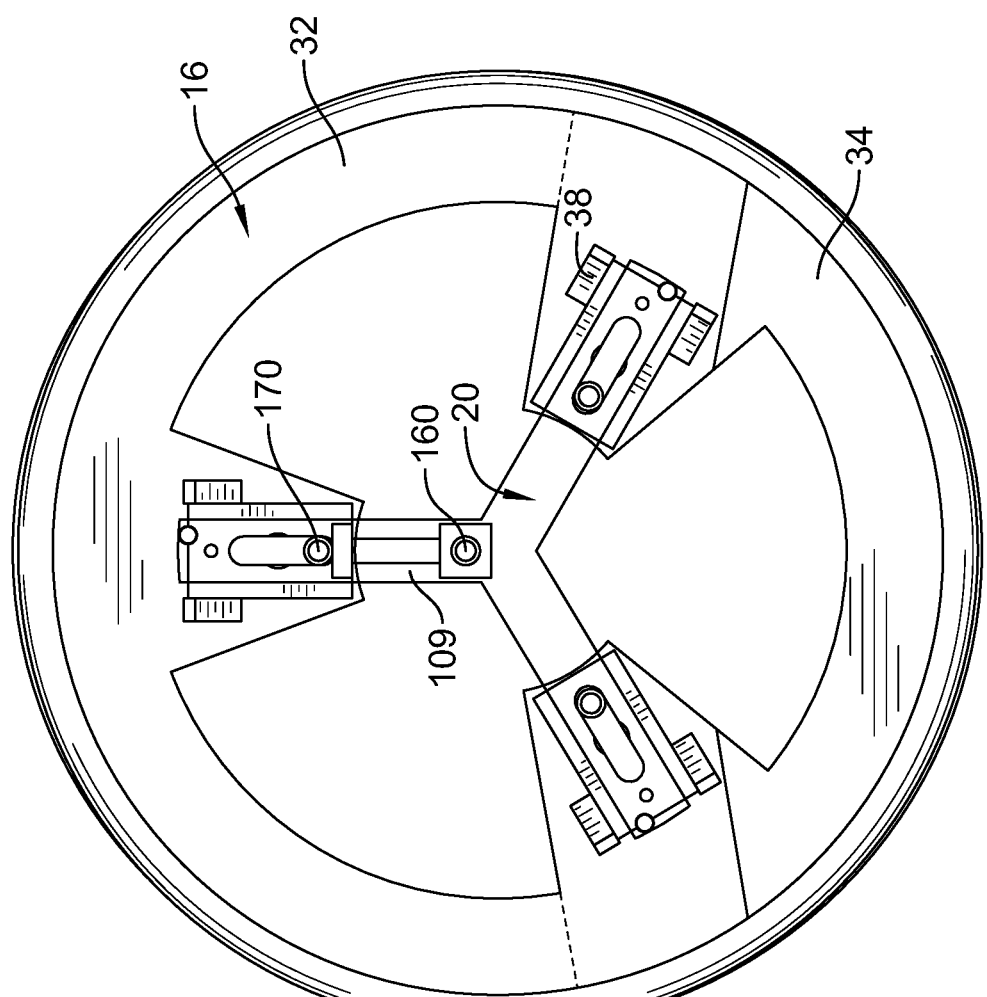
FIG. 9 includes FIGS. 9A to 9I, and shows an alternative initial mounting section of an attachment according to the invention.
Figure 9H:
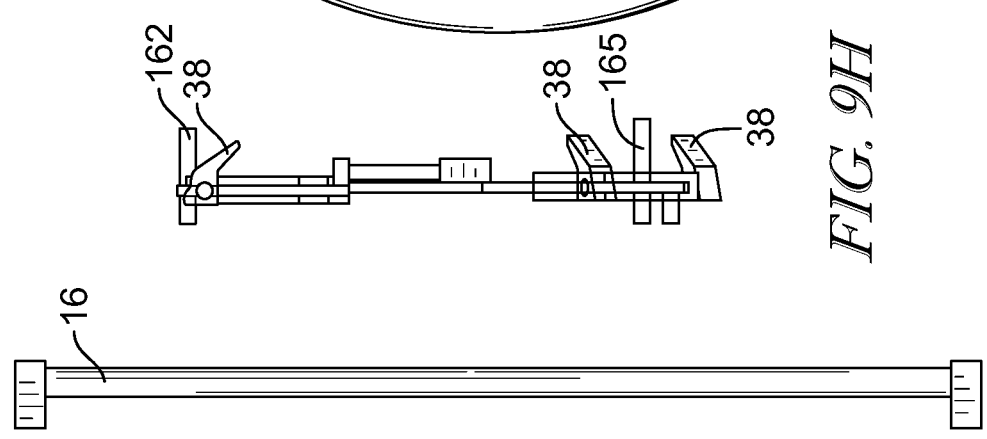
Figure 9G:

In FIGS. 9G-9I, the initial mounting section 20 from FIGS. 9A-9F is depicted with a tread section 16 specially coordinated to this initial mounting section 20. The tread section 16 has no own clamping devices 38 here, but it can also have additional own clamping devices 38. In the variant shown, the initial mounting section 20 can first be hooked with the clamping devices 38 lying underneath in FIGS. 9G-9I behind the rim flange 10. The two clamping devices 38 lying underneath are already stopped here in their position relative to the struts 109. Then the strut 109 of the initial mounting section 20 directed upwards in FIGS. 9G-9I is likewise placed on the rim 2, whereby the tyre is lifted from the rim flange 10 via a tyre displacement device 165 designed as a rigid extension, so that the upper clamping device 38 with the sliding element 104 to which it is fastened can be moved easily via the traction device 160 towards the rim flange 10 so that it can engage behind this. The sliding element 104 and the clamping device 38 is then stopped by means of the screw 170, which represents a fixing means 110, relative to the corresponding strut 109.

The first circumferential segment 32 of the tread section 16 is then fastened first to the initial mounting section 20. The vehicle wheel is then rotated so that the first circumferential segment 32 of the tread section contacts the road. And in a final step the second circumferential segment 34 of the tread section 16 is affixed to the initial mounting section 20.

In the case of an initial mounting section 20 such as shown in FIG. 9, it is also possible to fasten the initial mounting section 20 on the vehicle wheel first. In a next step it is then possible to drive with the damaged vehicle wheel 1 onto a small wedge-shaped ramp so that the vehicle wheel 1 with the flat tyre 3 is raised from the road. A tread section 16 also designed integrally in a circumferential direction U can then be placed very simply onto the initial mounting section 20 braced on the vehicle wheel 1 or on the rim 2.

Figure 10A:
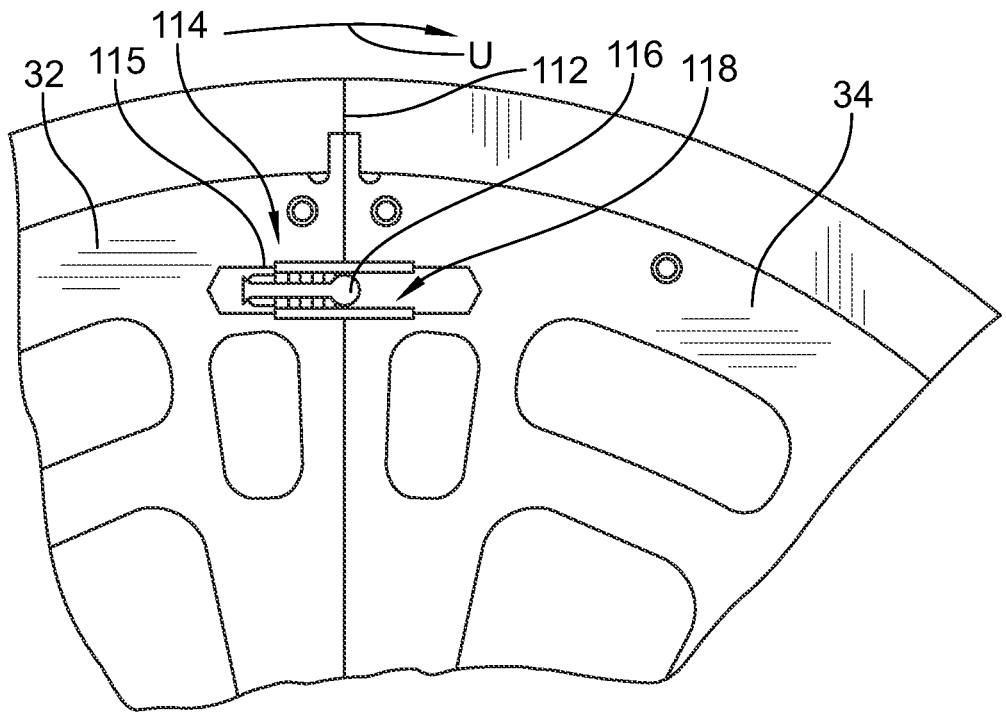
FIG. 10 includes FIGS. 10A and 10B, and shows a region around a contact surface between two circumferential segments of a tread section.
Figure 10B:
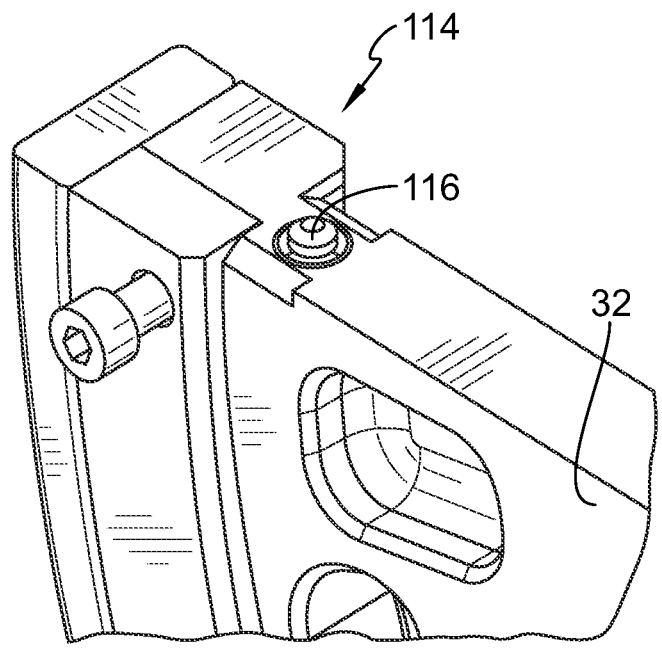

If the tread section 16 has several circumferential segments, for example the first circumferential segment 32 and the second circumferential segment 34, it is advantageous if a connection device 114 is arranged on their contact faces 112 to one another. This is illustrated in FIGS. 10-12. The connection device 114 can be implemented, for example, via an element 116 preloaded via a spring 115, which element is arranged in one of the circumferential segments and protrudes spring-loaded from the contact face 112 in a circumferential direction. Arranged in the other circumferential segment is a corresponding recess 118 into which the spring-preloaded element 116 can engage.

After the first circumferential segment 32 has been fastened to the initial mounting section 20, the second circumferential segment 34 can be pushed on in an axial direction A. When the two contact faces 112 slide over one another, the spring-preloaded element 116 is pushed in circumferential direction U into the first circumferential segment 32, wherein the spring-preloaded element 116 engages in the recess 118 on the second circumferential segment 34 when the second circumferential segment 34 has been pushed fully into the provided position in axial direction A.

An advantageous variant of the attachment 14 is shown in FIGS. 11 and 12.

The attachment 14 preferably has a tread section 16 with precisely two circumferential segments 32, 34, which in particular both have a circumferential extension of 180°. The circumferential segments 32, 34 are preferably substantially of identical construction. The two circumferential segments 32, 34 preferably have identical base elements 120.

The base elements 120 are preferably designed as castings. Preferably arranged on each of these two circumferential segments are precisely two clamping devices 38, which are each designed as pivotable hook elements 44.

The clamping devices 38 are preferably designed as a prefabricated part 123, which is screwed onto the base elements 120 of the circumferential segments 32, 34. This is shown clearly in FIGS. 15 and 16. The contact element 52 is preferably arranged on the prefabricated part 123 and can be fitted with this on the base element 120.

Each of the hook elements preferably has an extension 124 in a circumferential direction of at least 30 mm, preferably 40 mm, in particular 50 mm.

The locking mechanism 56 is shown in detail in FIG. 11C. The locking mechanism 56 comprises a latching element 58, which is implemented so that in the state shown in FIG. 11C, in which it locks the hook element 44, it has fully entered the casing 126 (FIG. 16). Before the hook element 44 is in the position in which it engages behind the rim flange 10, the latching element 58 does not yet lock the hook element 44 and protrudes with its rear section 128 from the casing 126 (FIG. 15).

The rear section 128 is preferably executed with a signal colour, for example red. The rear section 128 protruding from the casing 126 is preferably visible from the side of the attachment facing away from the vehicle wheel 1 when looking in the axial direction A. The attachment 14 thus comprises a visual check of whether the clamping devices 38 or hook elements are fully pivoted into rear engagements with the rim flange 10. This is also shown clearly in FIG. 15.

FIG. 12 shows the attachment from FIG. 11 once again in various sectional depictions.

The initial mounting section 20 can be designed in particular so that it comprises in its diameter compressible plug-in elements 130 as gripping devices 22, which are insertable into the aforesaid opening 13, in particular polycontrol hole, of the rim 2, wherein they are reducible in their diameter on insertion. The plug-in elements 130 can be designed to engage behind the opening 13 or to engage frictionally in this (a version for positive rear engagement is depicted in FIGS. 11 and 12). The initial mounting section 20 preferably has a spreading element 132, which either spreads the plug-in elements and/or prevents them from being compressed in diameter when it is inserted into the plug-in elements. The latter variant makes sense in particular if the plug-in elements are designed to reduce in diameter on being plugged into the poly-control hole and to widen in the fully plugged-in state and engage behind the poly-control hole or opening.

The spreading elements 132 are preferably affixed to the initial mounting section 20 so that the initial mounting section 20 is affixed in one piece to the vehicle wheel 1 and the plug-in elements 132 can be introduced into the openings 13, in particular poly-control holes, of the rim 2, wherein the spreading elements 132 have not yet or not yet fully been inserted into the plug-in elements 130. The spreading elements 132 are preferably locked in this not fully introduced position in the initial mounting section 20, for example via a locking device 134. Following release of the locking by the locking device 134, it is possible, in particular by further pressure on the initial mounting section 20, to move a part 138 of the initial mounting section 20 preferably in axial direction A and hereby to introduce the unlocked spreading elements 132 fully into the plug-in elements 130 to fix the plug-in elements 130 firmly in the openings 13 by positive rear engagement or frictional engagement.

Figure 14C:
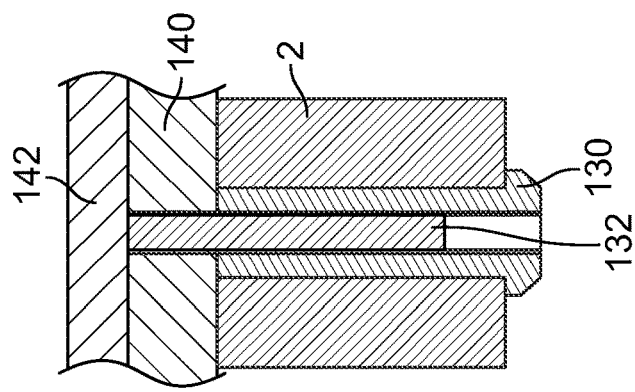
FIG. 14 includes FIGS. 14A to 14C, and shows another gripping device.
Figure 14B:
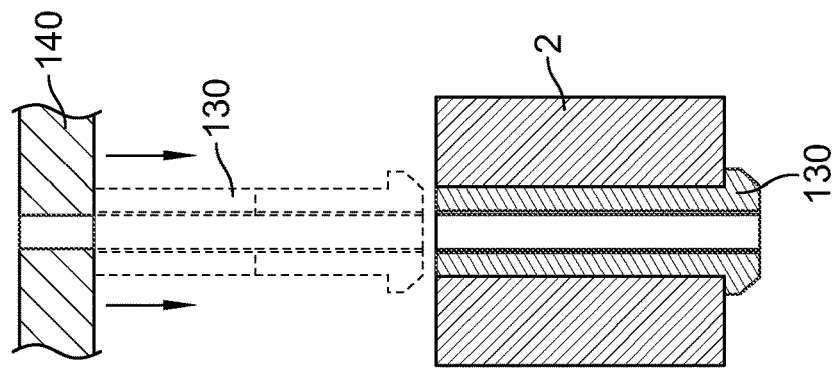
Figure 14A:
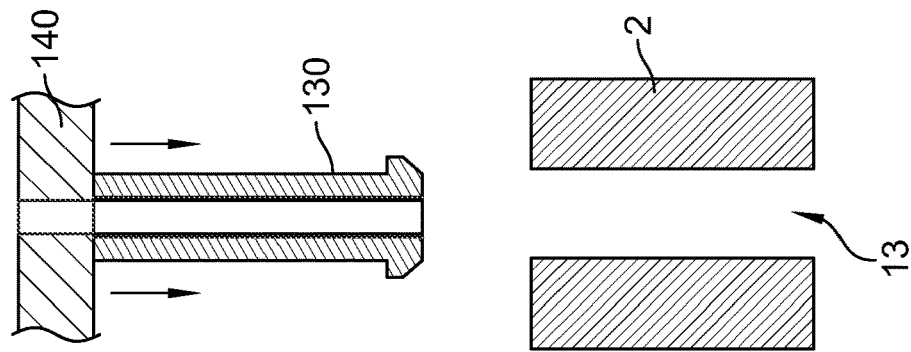
Figure 13:
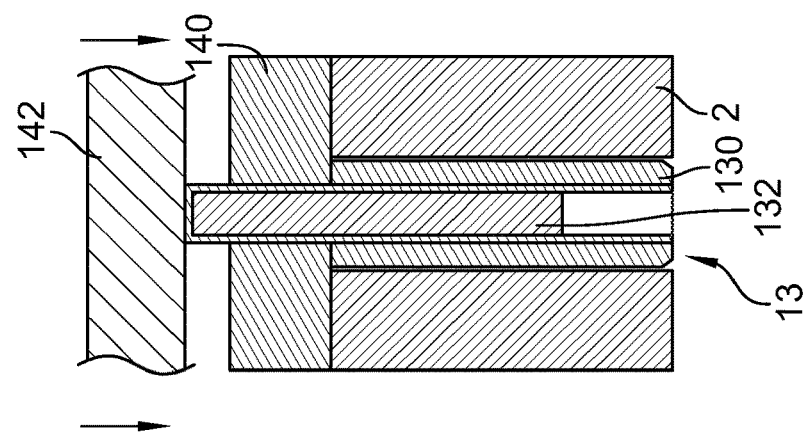
FIG. 13 shows a gripping device.
Figure 15A:
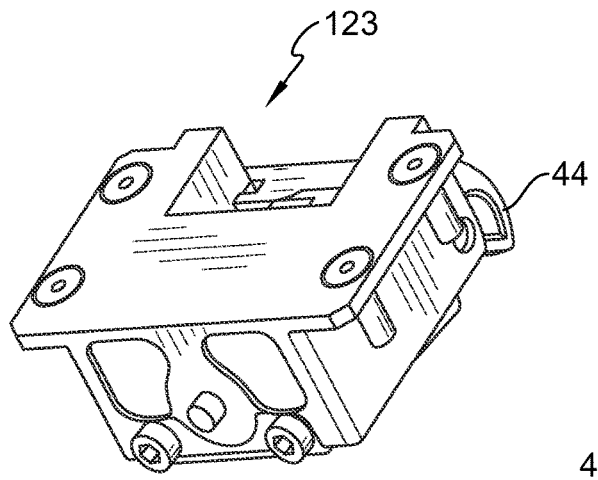
FIG. 15 includes FIGS. 15A to 15D, and shows a clamping device designed as a prefabricated part.
Figure 15B:
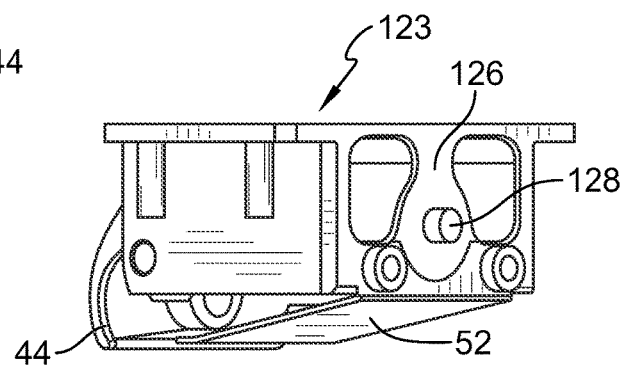
Figure 15C:
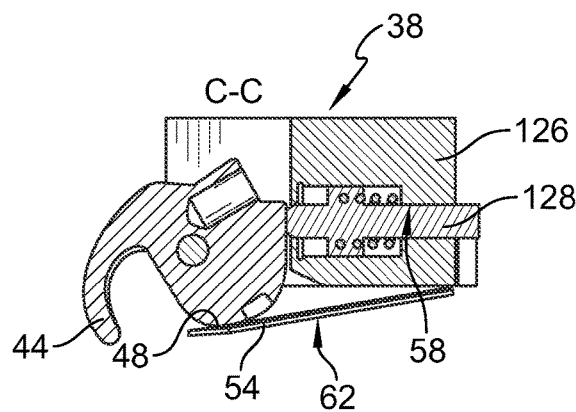
Figure 15D:
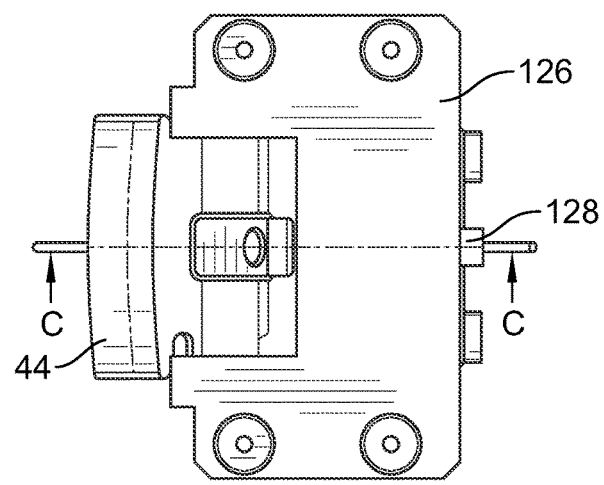
Figure 16A:
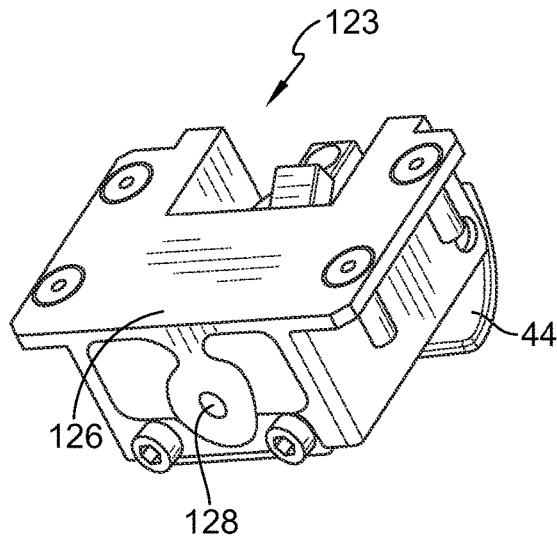
FIG. 16 includes FIGS. 16A to 16D, and shows the clamping device from FIG. 15 in the position in which it engages behind the rim flange, wherein the rim flange is not shown.
Figure 16B:
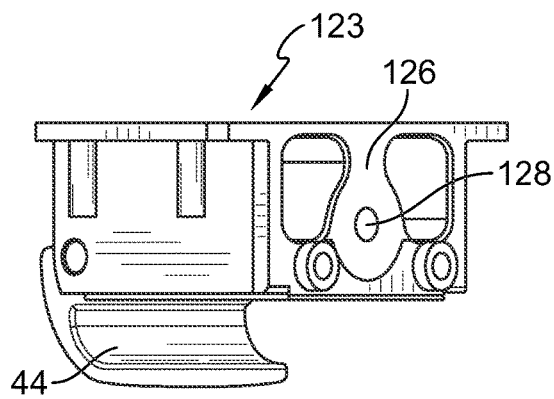
Figure 16C:
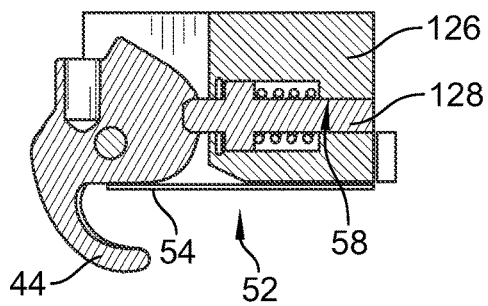
Figure 16D:
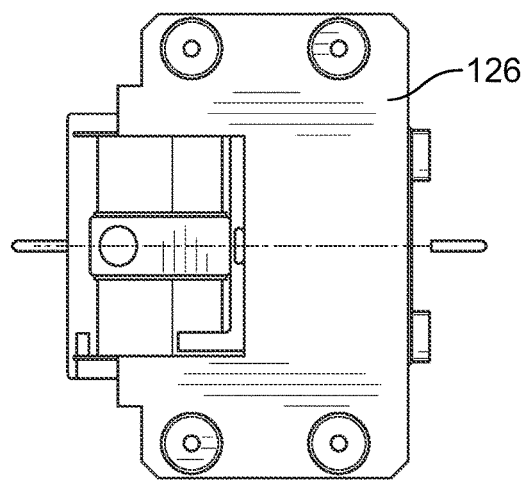

The initial mounting section 20 preferably has a first axial part 140 and a second axial part 142. The plug-in elements 130 are preferably arranged on the first axial part 140 and the spreading elements 132 on the second axial part 142. The two axial parts 140, 142 are initially spaced at a distance from one another and in this spaced position are locked via the locking device 134. The initial mounting section 20 with the two axial parts 140, 142 can then be affixed on the vehicle wheel, wherein the plug-in elements 130 are introduced into the openings 13. The locking device 134 is then unlocked and by further pressing of the initial mounting section 20 the second axial part 142 is moved towards the first axial part 140 and the spreading elements 132 enter the plug-in elements 130 to fix the plug-in elements 130 firmly in the openings 13 by positive rear engagement (FIG. 14) or frictional engagement (FIG. 13). The insertion of the spreading elements 132 can also be realised in a different way, however.

The initial mounting section 20 is preferably designed so that the initial mounting section 20 can be affixed to the vehicle wheel 1 with plug-in elements 130 and spreading elements 132, wherein the plug-in elements 130 are introduced into the openings 13 and in a second step the spreading elements 132 are actuated via a corresponding actuating mechanism, which is arranged on the initial mounting section 20 and can be designed, for example, as an actuating lever, and can be inserted into the plug-in elements 130, in order to fix the plug-in elements 130 firmly in the openings 13 by positive rear engagement or frictional engagement.

The invention claimed is:

1. An attachment for a vehicle wheel including a rim for enabling a driving operation with a restricted tyre function, the attachment comprising:
   a tread section with a tread,
   at least one clamping device configured to engage behind a section of the rim,
   an initial mounting section, wherein at least a part of the tread section is separate from the initial mounting section and is connectable to the initial mounting section in a detachable manner or is configured to be connected movably to the initial mounting section, wherein the initial mounting section is configured to lie radially internally with regard to the tread with the attachment fastened on the vehicle wheel, and a contact section configured to actuate the at least one clamping device and bring the at least one clamping device into rear engagement with a rim flange of the rim upon actuation of the contact section, and wherein the contact section is arranged on the tread section and the contact section is configured so that, upon affixing the tread section on the vehicle wheel, the contact section contacts the vehicle wheel and is actuated by such contact, or wherein the contact section is arranged on the initial mounting section and the contact section is configured so that, upon affixing the initial mounting section on the vehicle wheel, the contact section contacts the vehicle wheel and is actuated by such contact.

2. The attachment according to claim 1, wherein the clamping device is arranged on at least one of the tread section and the initial mounting section.

3. The attachment according to claim 1, wherein the contact section contacts the rim of the vehicle wheel upon affixing the attachment to the vehicle wheel.

4. The attachment according to claim 1, wherein the tread section, seen in circumferential direction, has at least two segments respectively comprising a portion of a circumference of the tread, which at least two segments are detachable from one another or are pivotable or displaceable relative to one another.

5. The attachment according to claim 1, wherein the contact section is arranged on a side of the attachment facing the vehicle wheel upon fastening the attachment to the vehicle wheel.

6. The attachment according to claim 1, wherein the tread section has precisely two circumferential segments, both have a circumferential extension of 180°, wherein the two circumferential segments each have identical base elements, and wherein arranged on each of the two circumferential segments are precisely two clamping devices which each comprise pivotable hook elements.

7. The attachment according to claim 6, wherein one or each of the clamping devices is affixed to the base element of an associated one of the two circumferential segments.

8. The attachment according to claim 7, wherein the prefabricated part comprises the contact section.

9. The attachment according to claim 1, wherein the clamping device is formed by a pivoted hook element with a rear grip section, wherein the rear grip section engages behind a rim flange of the rim upon rear engagement of the clamping device with the rim flange, wherein arranged on the hook element is an actuation section connected rigidly to the rear grip section.

10. The attachment according to claim 1, further comprising a contact element on which the contact section is arranged, wherein the contact element is separate from the clamping device and is arranged displaceably or pivotably in the axial direction on the attachment.

11. The attachment according to claim 1, further comprising a locking mechanism arranged to lock the clamping device upon rear engagement of the clamping device with the rim flange.

12. The attachment according to claim 11, wherein the locking mechanism is configured to contact the road with a securing section with the attachment affixed to the vehicle wheel and with the vehicle wheel rotating and thereby to actuate the securing section, wherein the locking mechanism is configured so that a securing element is moved upon actuation of the securing section into a securing position in which the securing element is held positively and from which the securing element can only be released by a tool, wherein the securing element locks the clamping device positively in the rear engagement position with the rim flange in the securing position.

13. The attachment according to claim 1, wherein the initial mounting section comprises at least one guide projection running in the axial direction and the tread section comprises at least one guide opening is configured complementary to the guide projection, so that upon affixing the initial mounting section to the vehicle wheel, the tread section or a portion of the tread section is connectable to the initial mounting section in such a way that the guide projection engages in the guide opening and an axial assembly movement of the tread section relative to the initial mounting section and the vehicle wheel is guided by the engagement of the guide projection in the guide opening.

14. The attachment according to claim 1, wherein the initial mounting section comprises a plurality of struts extending radially outwards and each having at least one guide projection.

15. The attachment according to claim 14, wherein the tread section is configured to be fastened detachably on the initial mounting section by a fastening device, wherein the fastening device is configured so that the tread section moves when fastened to the initial mounting section in an axial direction towards the rim.

16. The attachment according to claim 1, wherein the tread section comprises a plurality of struts running in the radial direction and spaced by gaps, wherein the gaps have a circumferential extension that is greater than a circumferential extension of the struts.

17. The attachment according to claim 1, wherein the initial mounting section is configured to be fastened to the vehicle wheel by at least one of a positive rear engagement of a gripping device and a frictional engagement of the gripping device with an opening in the rim, which opening is arranged in the region of a bolt pattern, wherein the opening is spaced at a distance in the rim from holes provided to receive wheel bolts or stay bolts in the rim.

18. The attachment according to claim 17, wherein the gripping device comprises one of an expandable section configured to engage behind the opening in the region of the bolt pattern and a compressible section configured to be guided in a compressed state through the opening in the region of the bolt pattern and to expand into an uncompressed state when guided through the opening.

19. The attachment according to claim 1, wherein the initial mounting section is configured to be affixed to the vehicle wheel by plug-in elements and spreading elements, wherein the plug-in elements are introduced into the openings and the spreading elements are configured to be actuated by a corresponding actuating mechanism arranged on the initial mounting section to be inserted into the plug-in elements in order to fix the plug-in elements in the openings by positive rear engagement or frictional engagement.

20. The attachment according to claim 1, wherein the initial mounting section has a plurality of clamping devices distributed in circumferential direction, wherein the initial mounting section has a crosswise structure with struts extending radially outwards, and wherein at least one of the clamping devices is arranged movably in the radial direction on the initial mounting section.

21. The attachment according to claim 20, wherein the clamping devices are configured to be fixed on the attachment in different positions each spaced radially at a distance from one another, wherein the different positions are coordinated to different rim diameters, and wherein at least one of the plurality of clamping devices is movable in at least one of the positions in the radial direction.

* * * * *